(12) United States Patent
Fortin et al.

(10) Patent No.: US 10,953,731 B2
(45) Date of Patent: Mar. 23, 2021

(54) DOOR ASSEMBLY WITH COLLAPSIBLE CARRIER AND WATER SHIELD

(71) Applicant: Magna Closures Inc., Newmarket (CA)

(72) Inventors: Raymond Edward Fortin, Newmarket (CA); Eric V. Kalliomaki, Uxbridge (CA); Amandeep Kalra, Markham (CA)

(73) Assignee: Magna Closures Inc., Newmarket (CA)

( * ) Notice: Subject to any disclaimer, the term of this patent is extended or adjusted under 35 U.S.C. 154(b) by 119 days.

(21) Appl. No.: 15/638,555

(22) Filed: Jun. 30, 2017

(65) Prior Publication Data

US 2017/0313165 A1 Nov. 2, 2017

Related U.S. Application Data

(63) Continuation-in-part of application No. 15/497,437, filed on Apr. 26, 2017, now Pat. No. 10,676,975.

(60) Provisional application No. 62/329,241, filed on Apr. 29, 2016, provisional application No. 62/422,323, filed on Nov. 15, 2016.

(51) Int. Cl.
*B60J 5/04* (2006.01)

(52) U.S. Cl.
CPC .......... *B60J 5/0418* (2013.01); *B60J 5/0408* (2013.01); *B60J 5/0416* (2013.01); *B60J 5/0431* (2013.01); *B60J 5/0433* (2013.01); *B60J 5/0448* (2013.01); *B60J 5/0455* (2013.01); *B60J 5/0463* (2013.01); *B60J 5/0468* (2013.01); *B60J 5/0483* (2013.01)

(58) Field of Classification Search
CPC ..... E05F 11/382; E05F 11/481; E05F 11/486; E05F 11/488; B60J 5/0444; B60J 5/0445; B60J 5/0463; B60J 5/0418; B60J 5/0419; B60J 5/0448; B60J 5/0416; B60J 5/0433; B60J 5/0431; B60J 5/0429; B60J 1/17; E05D 15/165

See application file for complete search history.

(56) References Cited

U.S. PATENT DOCUMENTS

| | | | | |
|---|---|---|---|---|
| 2,501,092 A | * | 3/1950 | Rappl | E05F 15/57 49/349 |
| 5,050,347 A | * | 9/1991 | Brusasco | B60J 5/0416 49/348 |
| 5,062,240 A | * | 11/1991 | Brusasco | B60J 5/0416 296/153 |
| 5,469,664 A | * | 11/1995 | Staser | B60J 1/17 49/452 |
| 5,617,675 A | * | 4/1997 | Kobrehel | E05F 11/485 49/352 |

(Continued)

*Primary Examiner* — Johnnie A. Shablack
*Assistant Examiner* — Abe Massad
(74) *Attorney, Agent, or Firm* — Dickinson Wright PLLC

(57) ABSTRACT

A door assembly for a motor vehicle comprised of an outer door panel and an inner door panel interconnected to define a door panel structure having an internal door cavity. A collapsible carrier module is configured to be oriented in a collapsed arrangement to facilitate installation into the door cavity through an opening in the inner door panel. The collapsible carrier module can be moved from its collapsed arrangement into an expanded arrangement upon installation within the door cavity to facilitate subsequent mounting to the door panel structure. The collapsible carrier module includes a barrier configured to close off the opening in the inner panel.

19 Claims, 33 Drawing Sheets

(56) References Cited

U.S. PATENT DOCUMENTS

| | | | | |
|---|---|---|---|---|
| 5,946,858 | A * | 9/1999 | Staser | E05F 11/488 49/139 |
| 6,134,840 | A * | 10/2000 | Pleiss | B60J 5/0416 49/348 |
| 6,301,835 | B1 * | 10/2001 | Pfeiffer | B60J 5/0416 296/146.5 |
| 6,615,475 | B2 * | 9/2003 | Berta | B60J 5/0416 29/434 |
| 6,767,049 | B1 * | 7/2004 | Morrison | B60J 5/0418 296/1.08 |
| 6,862,846 | B1 * | 3/2005 | Kirejczyk | B60J 5/0416 296/146.7 |
| 6,931,791 | B1 * | 8/2005 | Pleiss | B60J 5/0416 49/352 |
| 7,607,716 | B2 | 10/2009 | Buchta et al. | |
| 8,020,919 | B2 * | 9/2011 | Lin | B60J 5/0416 296/146.1 |
| 8,136,866 | B2 | 3/2012 | Broadhead | |
| 2003/0097797 | A1 * | 5/2003 | Cucchiara | B60J 5/0416 49/502 |
| 2007/0163177 | A1 * | 7/2007 | Heyer | B60J 5/0416 49/348 |

* cited by examiner

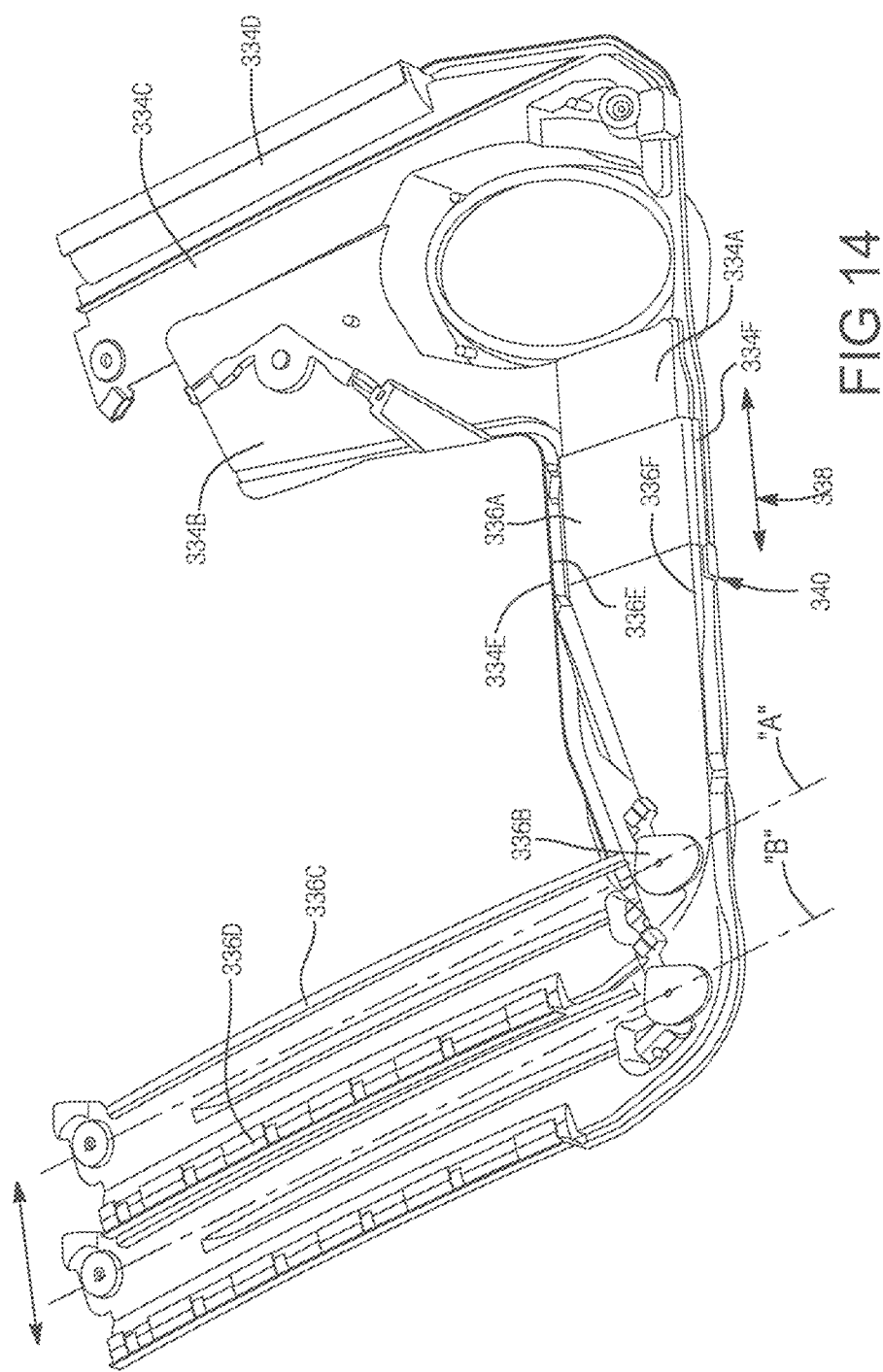

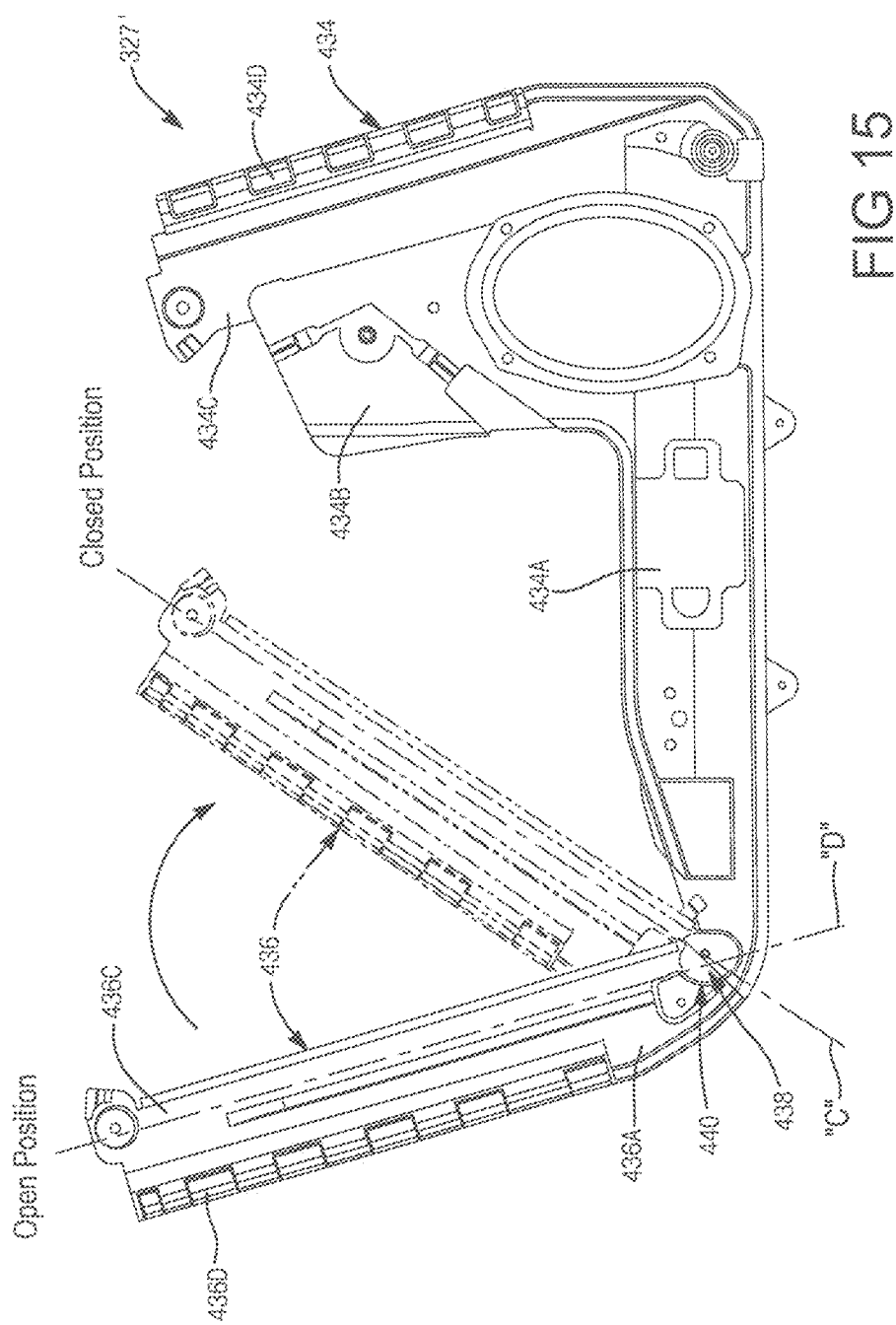

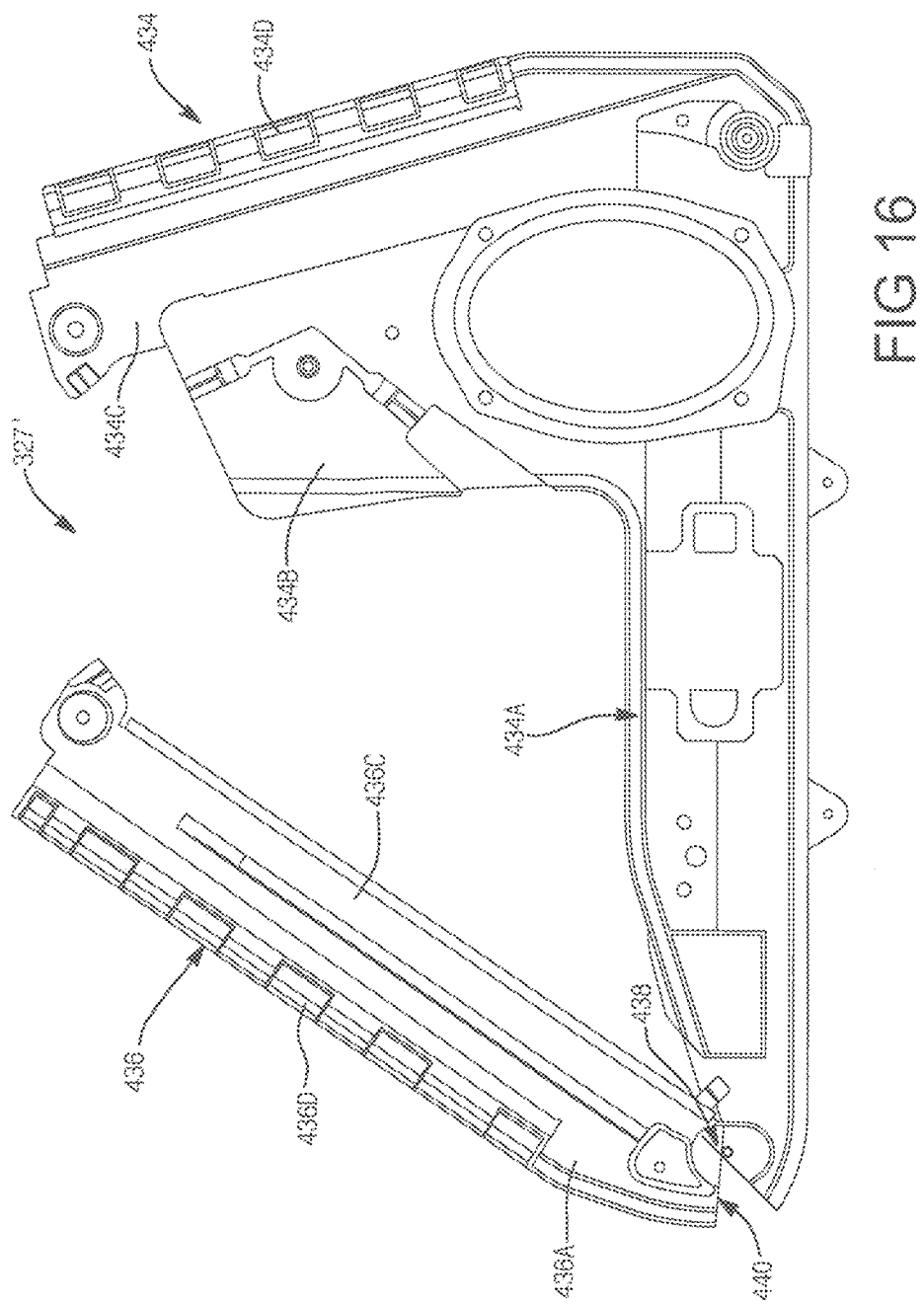

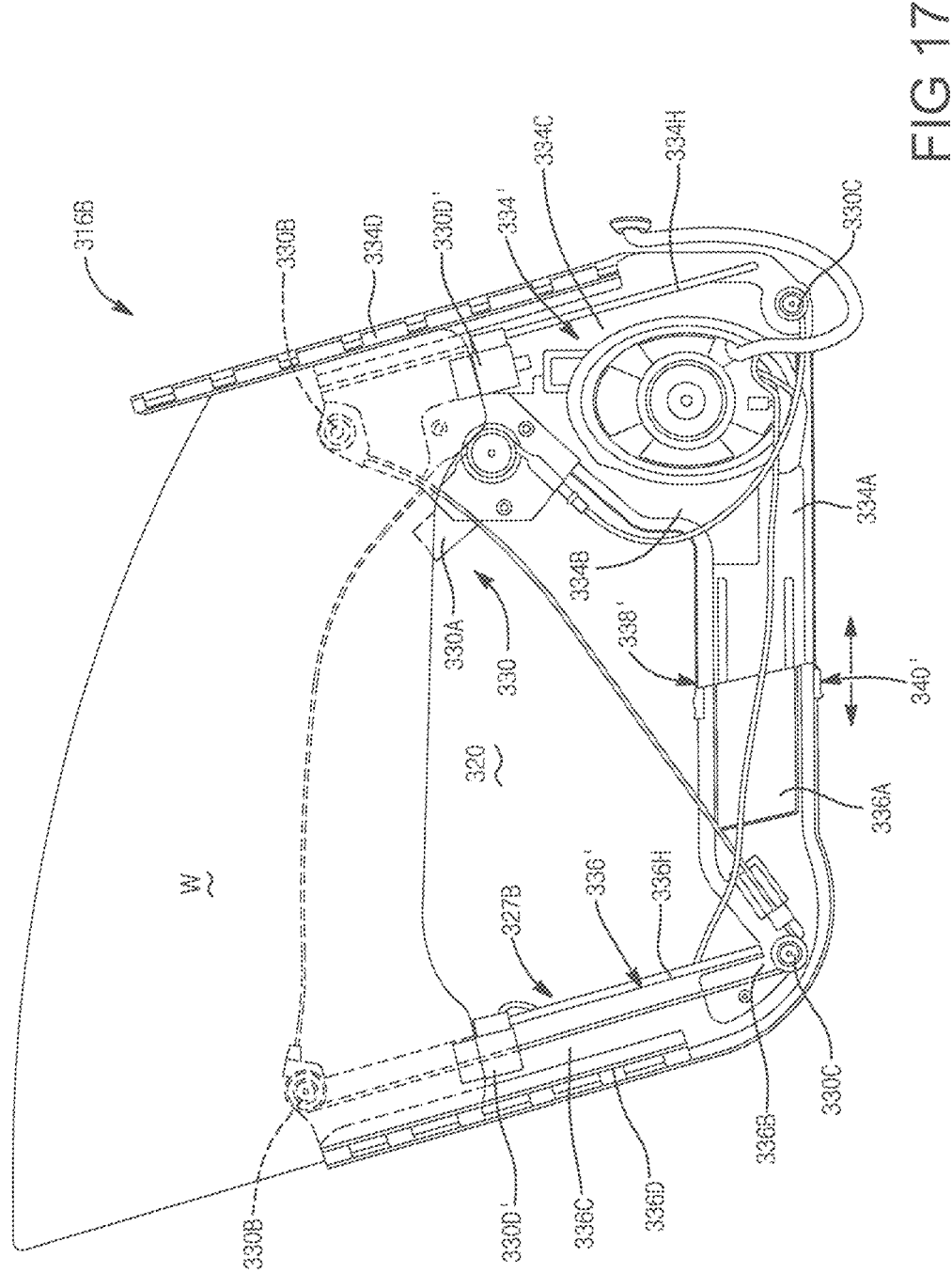

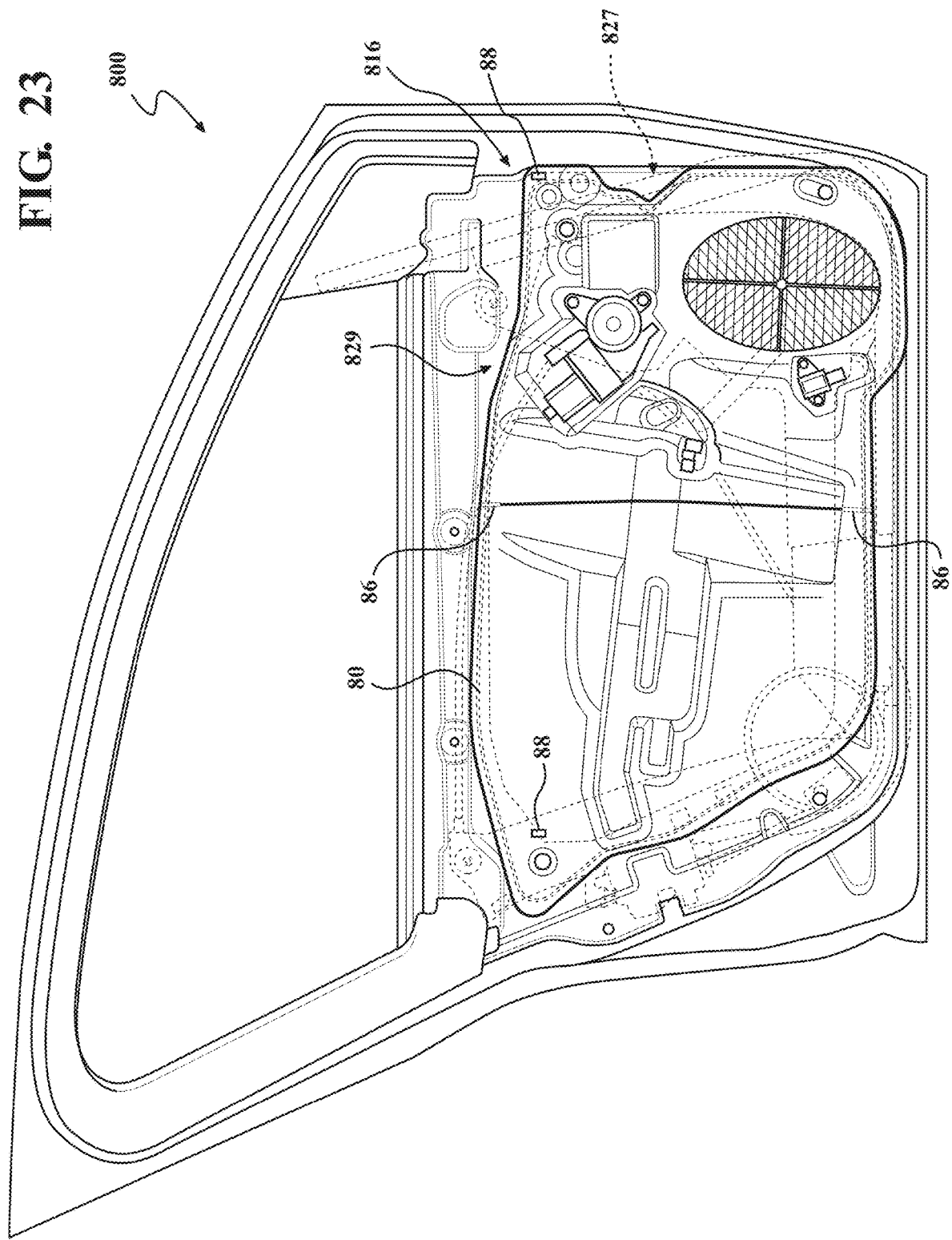

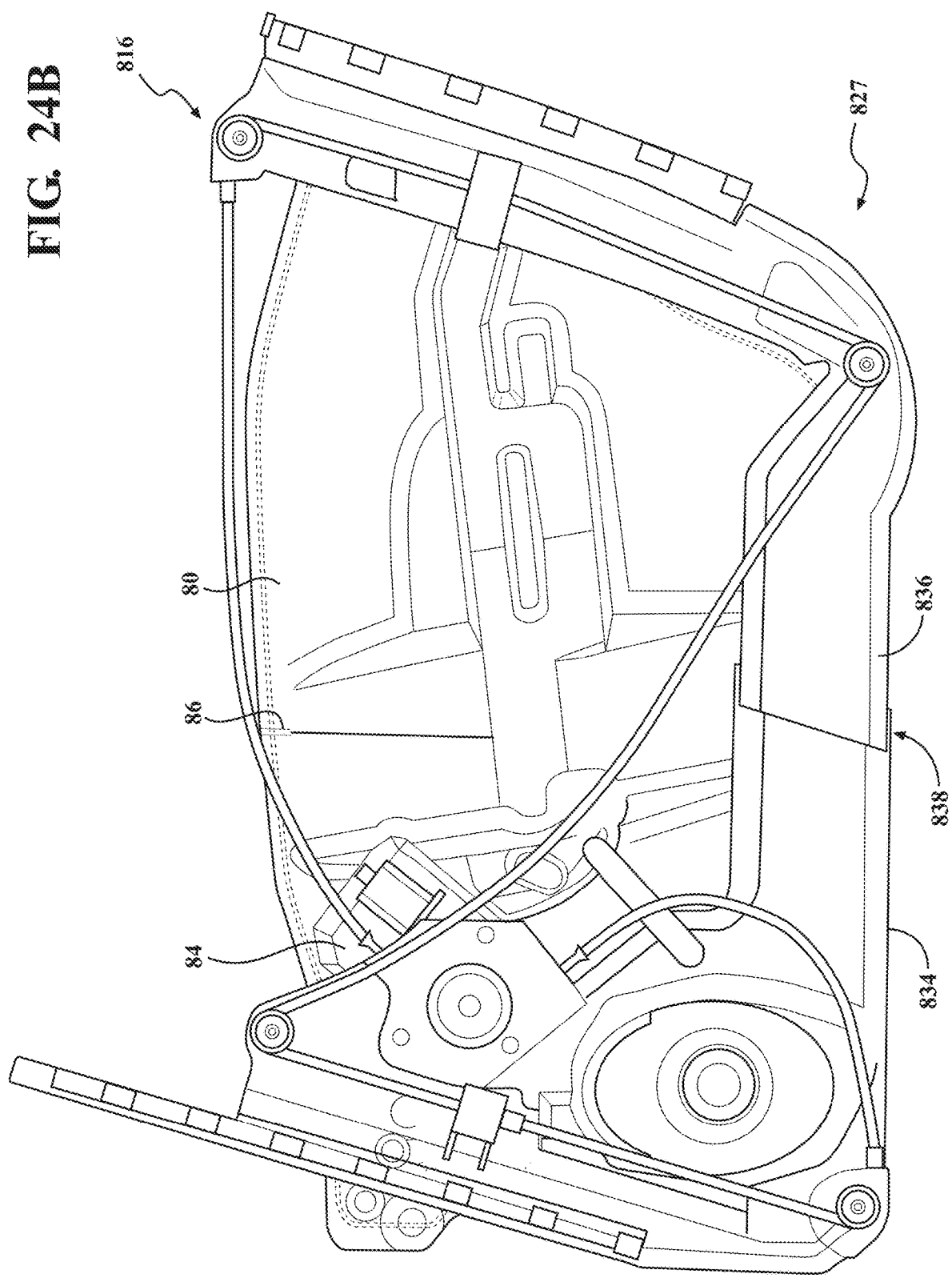

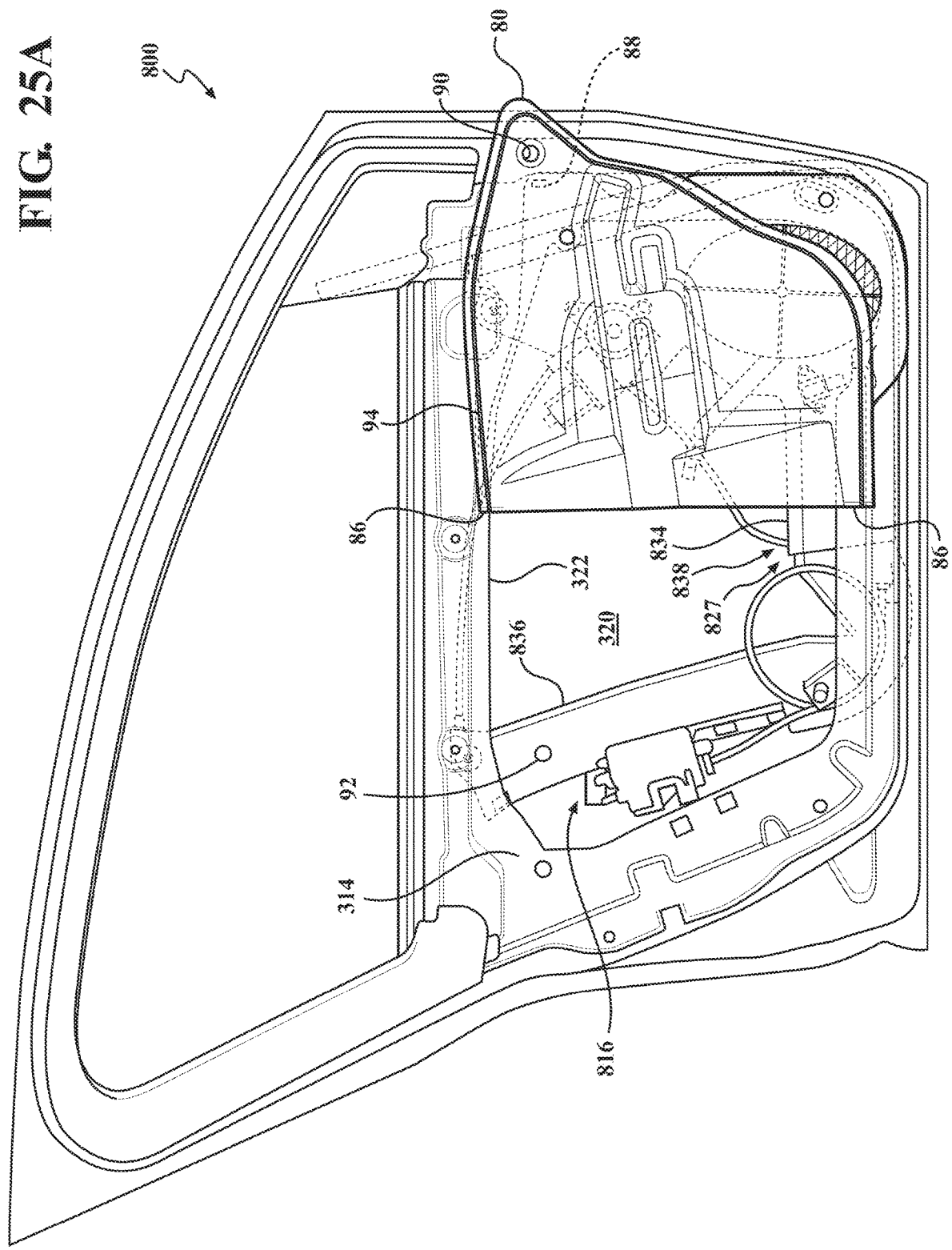

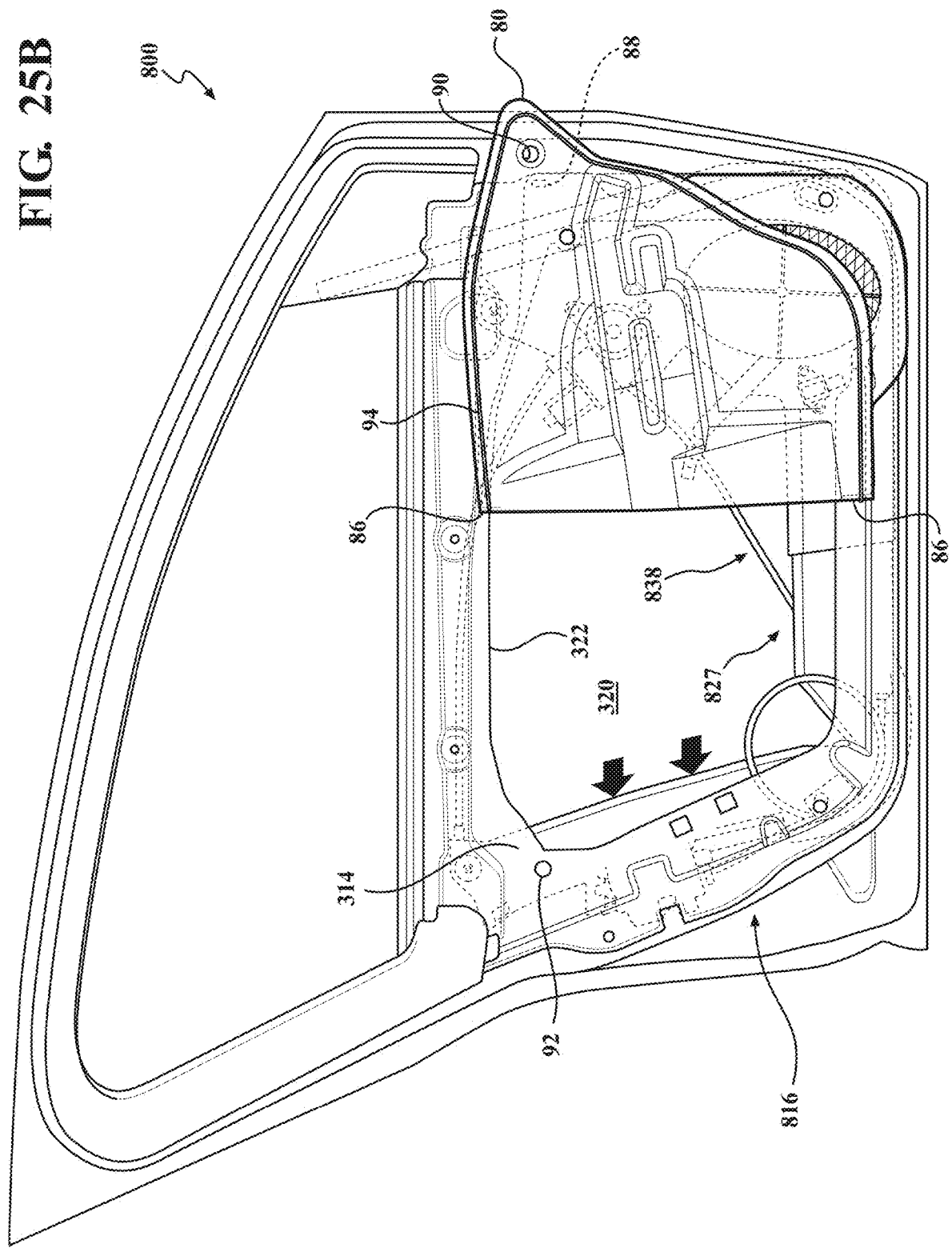

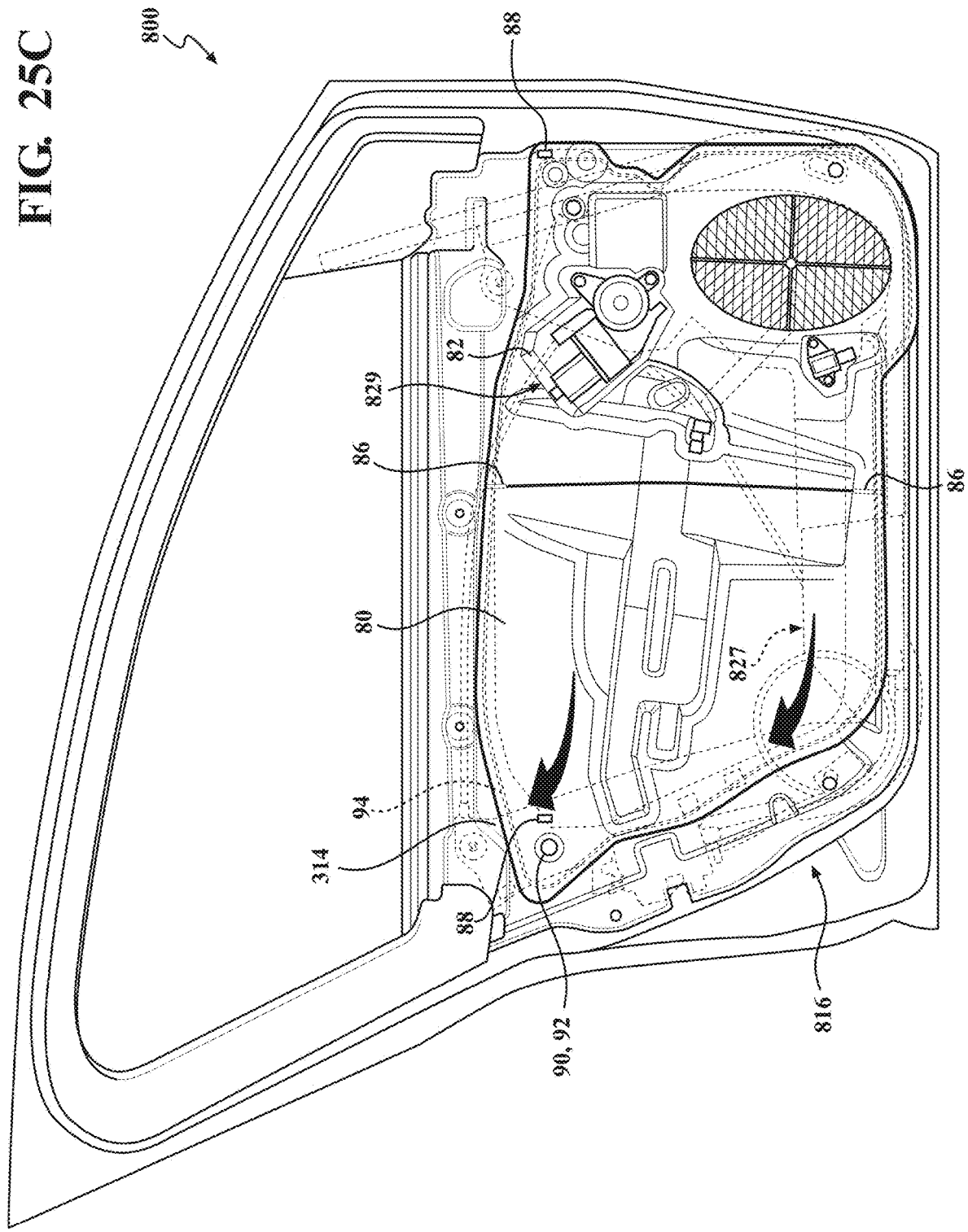

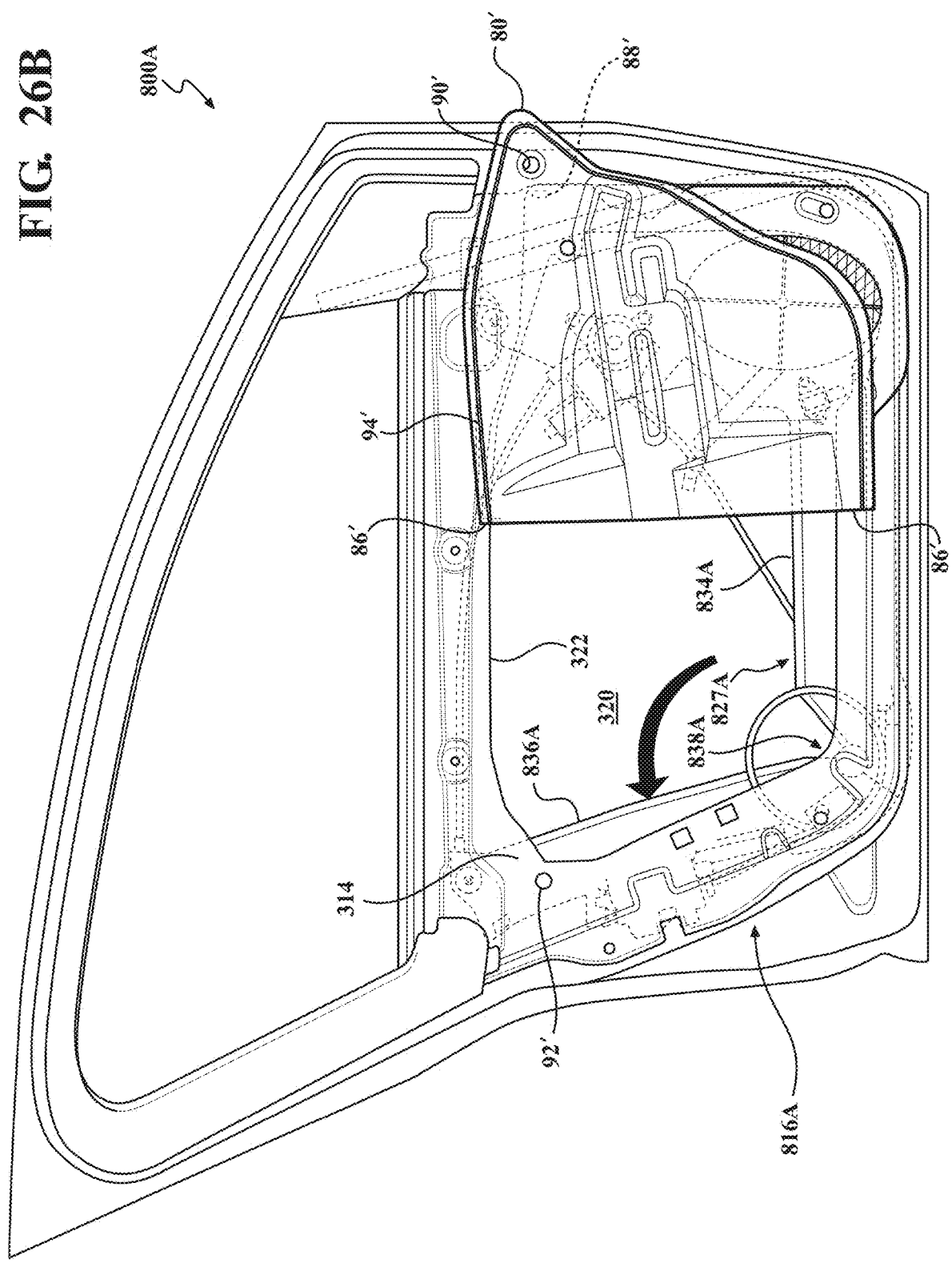

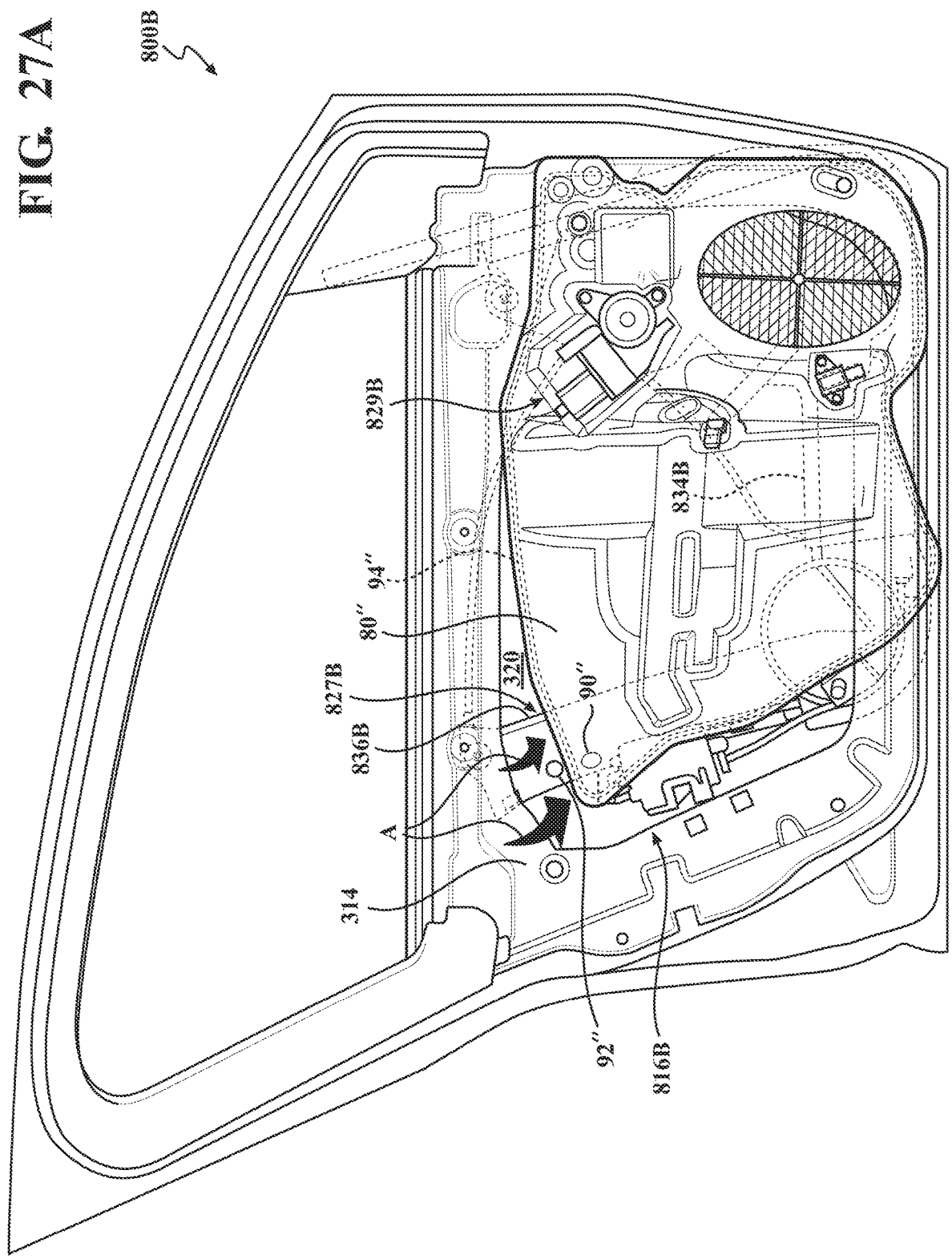

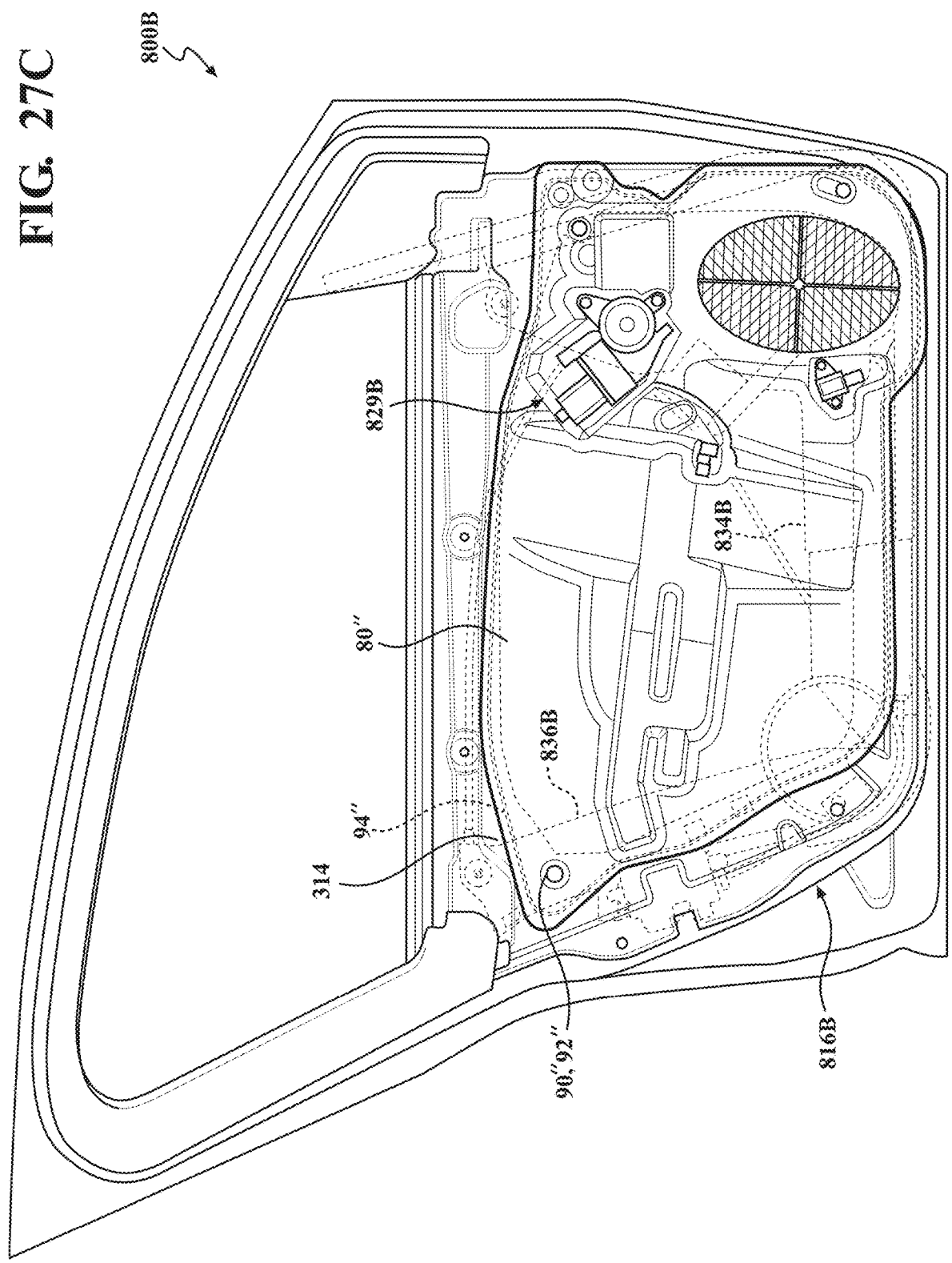

DOOR ASSEMBLY WITH COLLAPSIBLE CARRIER AND WATER SHIELD

CROSS-REFERENCE TO RELATED APPLICATIONS

This application is a continuation-in-part of U.S. application Ser. No. 15/497,437, filed Apr. 26, 2017, which claims the benefit of U.S. Provisional Application No. 62/329,241 filed Apr. 29, 2016 and U.S. Provisional Application No. 62/422,323 filed Nov. 15, 2016. The entire disclosure of each of the above applications is incorporated herein by reference.

STATEMENT REGARDING FEDERALLY SPONSORED RESEARCH OR DEVELOPMENT

This invention was made with government support under DE-EE0007306 awarded by DOE. The government has certain rights in the invention.

FIELD

The present disclosure relates generally to vehicle door assemblies equipped with a carrier configured to hold various door hardware components. More particularly, the present disclosure relates to a collapsible carrier being operable to move from a collapsed configuration for permitting installation into the vehicle door assembly into an expanded configuration following installation.

BACKGROUND

This section provides background information related to the present disclosure which is not necessarily prior art.

In many motor vehicle door assemblies, an outer sheet metal door panel and an inner sheet metal door panel are connected together to define an internal door cavity therebetween. An equipment module or sub-assembly, commonly referred to as a carrier, is often mounted to the inner door panel within the internal door cavity. In addition, an impact beam, also known as an intrusion beam, is typically welded to the inner door panel to resist deformation of the door assembly during a side impact collision. The use of carriers and side impact beams increase the thickness of the door assembly and can require pre-assembly to the inner door panel prior to its subsequent connection to the outer door panel. Specifically, the impact beam typically extends across an opening formed in the inner door panel that is used to install and mount the carrier to the inner door panel within the internal door cavity, and thus can interfere with the mounting of the carrier.

In view of the above, there is a need to provide a door assembly that provides required occupant protection while also being relatively simple to manufacture and assemble. Specifically, a need exists to advance the art in the arrangements and methods used for installing the carrier through the opening and subsequently mounting the carrier to the inner door panel within the internal door cavity.

SUMMARY

This section provides a general summary of the disclosure and is not intended to be considered a complete and comprehensive listing of the disclosure's full scope or all of its aspects, advantages, objectives and/or features.

In an aspect, the present disclosure is directed to a door assembly for a motor vehicle configured to include an outer panel, an inner panel, an intrusion member, and a carrier module. The outer panel and the inner panel, when connected together, form a door panel structure which is configured to define an internal door cavity. The intrusion member is disposed within the internal door cavity and its opposite ends are mounted to the door panel structure. The carrier module is configured to include a plurality of door hardware components. One feature of the present disclosure is directed to the carrier module having a carrier plate that is "collapsible" to facilitate installation into the internal door cavity through an opening formed in the inner panel. In particular, the carrier plate associated with the collapsible carrier module is configured to move from a pre-installed or "collapsed" configuration to a post-installed or "expanded" configuration. The collapsed configuration is provided to permit installation of the carrier module through the opening in the inner door panel. Following installation into the door cavity, the carrier plate of the collapsible carrier module is moved into its expanded configuration and subsequently attached to structural portions of the inner door panel and/or other portions of the door panel structure. Another feature of the present disclosure is directed to providing the carrier module with an additional barrier component. Specifically, following attachment of the carrier plate to structural portions of the inner door panel, a barrier is sealed to an outer surface of the inner door panel to perfect a fluid-tight seal therebetween and to prevent the passage of fluid from a wet side of the inner door panel to a dry side of the inner door panel.

By providing a collapsible carrier module, the carrier module of the present disclosure can be mounted in the door panel structure relatively easily because the installer does not need to maneuver the carrier plate and the door hardware components mounted thereto around the intrusion member.

In one non-limiting embodiment of the collapsible carrier module, the carrier plate is formed to include two glass run channels. This is an advancement over conventional carriers of the type installed through an opening in the inner door panel and which only include one glass run channel. Additionally, the carrier plate may also be formed to include two slide rails configured to support the laterally-spaced window lifter plates associated with the window regulator.

In another non-limiting embodiment, the collapsible carrier module includes a carrier plate having a first carrier member formed with an integral first glass run channel, a second carrier member formed with an integral second glass run channel, and a barrier. The first and second carrier members are interconnected via a connection mechanism configured to permit relative axial movement between the carrier members between a first or retracted position and a second or extended position. The retracted position between the first and second carrier members establishes the collapsed configuration of the carrier module, while the extended position between the first and second carrier members establishes the expanded configuration of the carrier module. The barrier is fixed to one of the first and second carrier members and is moveable relative to the other of the first and second carrier members to permit relative translational movement between the first and second carrier members from the retracted position into the extended position and subsequently functions to close off the opening of an inner door panel through which the collapsible carrier module is installed.

In accordance with a revised version of the above-noted embodiment, the second carrier member of the carrier plate may further include a hinged connection mechanism between a base segment and the second glass run channel so as to permit the second glass run channel to pivot between a first or closed position relative to the base segment and a second or open position relative to the base segment. A locking mechanism permits movement of the second glass run channel from its closed position during installation of the carrier module through the opening in the inner door panel into its open position following installation of the carrier module into the internal door cavity, and further functions to rigidly latch the second glass run channel in its open position.

In another non-limiting embodiment, the collapsible carrier module includes a carrier plate having a first carrier member formed with an integral first glass run channel, a second carrier member formed with an integral second glass run channel, a pivot-type or hinge-type connection mechanism coupling the second carrier member to the first carrier member, a locking mechanism, and a barrier. The second carrier member is pivotably moveable relative to the first carrier member between a first or closed position and a second or open position. The closed position establishes the collapsed configuration of the carrier module while the open position establishes the expanded configuration thereof. A locking mechanism functions to permit movement of the second carrier member about the pivot/hinge connection mechanism from its closed position to its open position, and further functions to rigidly latch the second carrier member in its open position. The barrier is attached to at least one of the first and second carrier members and is configured for sealed attachment to an outer surface of the inner door panel to perfect a fluid-tight seal therebetween. The barrier also functions to prevent the passage of fluid from a wet side of the inner door panel to a dry side of the inner door panel.

In another non-limiting embodiment, the collapsible carrier module includes a two-piece carrier plate having a first carrier member and a second carrier member moveable relative to the first carrier member between a first position to define a pre-assembly configuration and a second position to define a post-assembly configuration. The first carrier member includes a first rail segment defining a first glass run channel and a first slider rail configured to support a first window lifter plate. The second carrier member includes a second rail segment defining a second glass run channel and a second slider rail configured to support a second window lifter plate. A window is disposed within the first and second glass run channels for movement between open and closed positions. The integration of the first and second slider rails with the first and second glass run channels eliminates the need to provide independent window guide rails so as to reduce the complexity of the collapsible carrier module.

Further areas of applicability will become apparent from the description provided herein. The description and specific examples in this summary are only intended to illustrate certain non-limiting embodiments which are not intended to limit the scope of the present disclosure.

DRAWINGS

The drawings described herein are for illustrative purposes only of selected non-limiting embodiments and are not intended to limit the scope of the present disclosure. In this regard the drawings include:

FIG. 1 illustrates a motor vehicle with a door assembly;
FIG. 2 is a perspective view of the door assembly shown in FIG. 1;
FIG. 3 is a perspective view of a door panel structure that is part of the door assembly shown in FIG. 2;
FIGS. 4a and 4b illustrate a carrier/intrusion member assembly that is part of the door assembly shown in FIG. 2;
FIG. 5a is a perspective view of a portion of the door assembly shown in FIG. 2;
FIG. 5b is a sectional end view of the door assembly shown in FIG. 2;
FIG. 5c is a magnified perspective view of a portion of the door assembly shown in FIG. 2;
FIG. 6 is a side view of a variant of the carrier/intrusion member assembly shown in FIGS. 4a and 4b;
FIG. 7 is a side view of another variant of the carrier/intrusion member assembly shown in FIGS. 4a and 4b;
FIG. 8 is an end view of the carrier/intrusion member assembly shown in FIG. 7, showing the optional use of an energy absorption member;
FIG. 9 shows a transparent side view of a carrier/intrusion member assembly;
FIG. 10 is a flow diagram illustrating the steps or operations associated with a method for making the door assembly;
FIG. 11 is a transparent perspective view of a door panel structure associated with a vehicle door assembly and which is equipped with a collapsible carrier module constructed in accordance with the teachings of the present disclosure;
FIG. 12 is another transparent perspective view of the door structure illustrating a carrier plate associated with the collapsible carrier module mounted with door hardware components and powered systems;
FIGS. 13 and 14 are perspective views of the carrier plate associated with the collapsible carrier module and illustrating its ability to move from a pre-installed collapsed configuration into a post-installed assembly configuration;
FIGS. 15 and 16 are perspective views of an alternative version of a carrier plate associated with the collapsible carrier module of the present disclosure and illustrating its ability to move from a pre-installed collapsed configuration into a post-installed assembly configuration;
FIG. 17 is a perspective view of an alternative embodiment of the collapsible carrier module equipped with a two-piece carrier plate assembled to include an integrated power window lift system configured for moving the window between open and closed positions;
FIG. 18 is a partial perspective view of a first carrier member associated with the two-piece carrier plate shown in FIG. 17 and which illustrate various components of a window regulator mechanism associated with the integrated power window lift system;
FIG. 19 is an enlarged, partially sectioned, view taken from FIG. 18 and illustrating a first guided lift plate/slider arrangement associated with the window regulator mechanism;
FIG. 20 is a partial perspective view of a second carrier member associated with the two-piece carrier plate shown in FIG. 17 and which illustrates various other components of the window regular mechanism;
FIG. 21 is an enlarged, partially sectioned, view taken from FIG. 20 and illustrating a second guided lift plate/slider arrangement associated with the window regulator mechanism;
FIG. 22 is a flow diagram illustrative of a method of making a door assembly in accordance with the present disclosure;
FIG. 23 is a side view of a dry side of a door assembly including a carrier module constructed in accordance with another aspect of the disclosure;

FIG. 24B is a wet side view of the carrier module of FIG. 23;

FIG. 25A is a side view of a dry side of the door assembly showing the carrier module of FIGS. 24A-24C being assembled thereto with a carrier plate of the carrier module shown a pre-installed collapsed configuration and the barrier of the carrier module shown in a pre-installed folded configuration;

FIG. 25B is a view similar to FIG. 25A with the carrier plate shown in an extended, post-installed assembly configuration;

FIG. 25C is a view similar to FIG. 25B with the barrier shown in an unfolded, post-installed assembly configuration;

FIG. 26B is a view similar to FIG. 26A with the carrier plate shown in an extended, post-installed assembly configuration;

FIG. 27A is a side view of a dry side of the door assembly showing a carrier module constructed in accordance with another aspect of the disclosure being assembled thereto with a carrier plate of the carrier module shown a pre-installed collapsed configuration and a barrier of the carrier module shown pulled outwardly from the carrier plate;

FIG. 27C is a view similar to FIG. 27B with the barrier shown in a post-installed assembly configuration.

Corresponding reference numerals indicate corresponding parts throughout the several views shown in the drawings.

DETAILED DESCRIPTION

The following is a detailed description of example embodiments of a collapsible carrier module of the type configured to be installed within an internal door cavity of a motor vehicle door assembly. Each of the example embodiments of the collapsible carrier module includes a two-member carrier plate configured to provide a pre-installed/collapsed arrangement and a post-installed/assembled arrangement. These example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
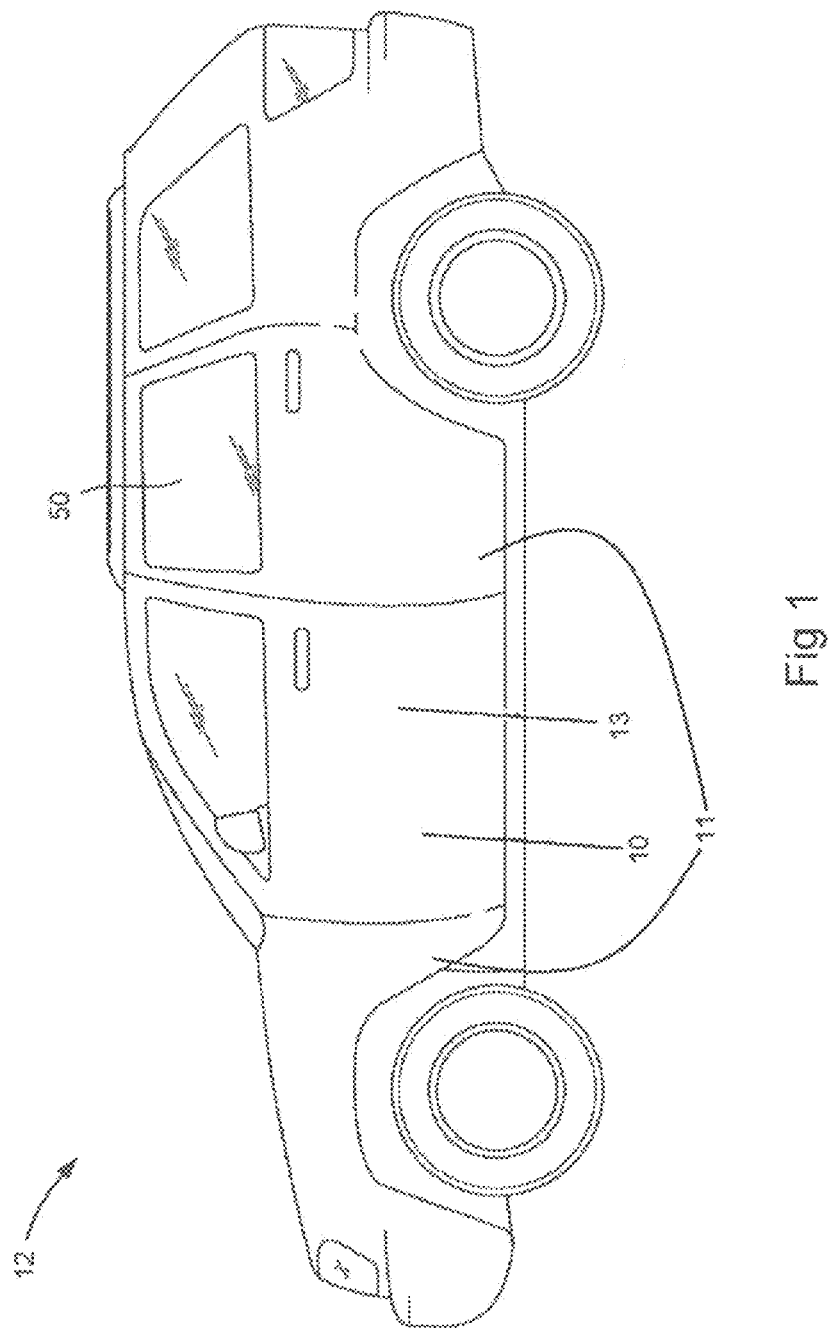

Reference is made to FIG. 1, which shows a door assembly 10 mounted to a body 11 of a motor vehicle 12. The door assembly 10 includes an outer panel 13, an inner panel 14 (FIG. 2), and a carrier/intrusion member assembly 16. The production of the door assembly 10 is facilitated directly as a result of the carrier/intrusion member assembly 16.

Figure 3:
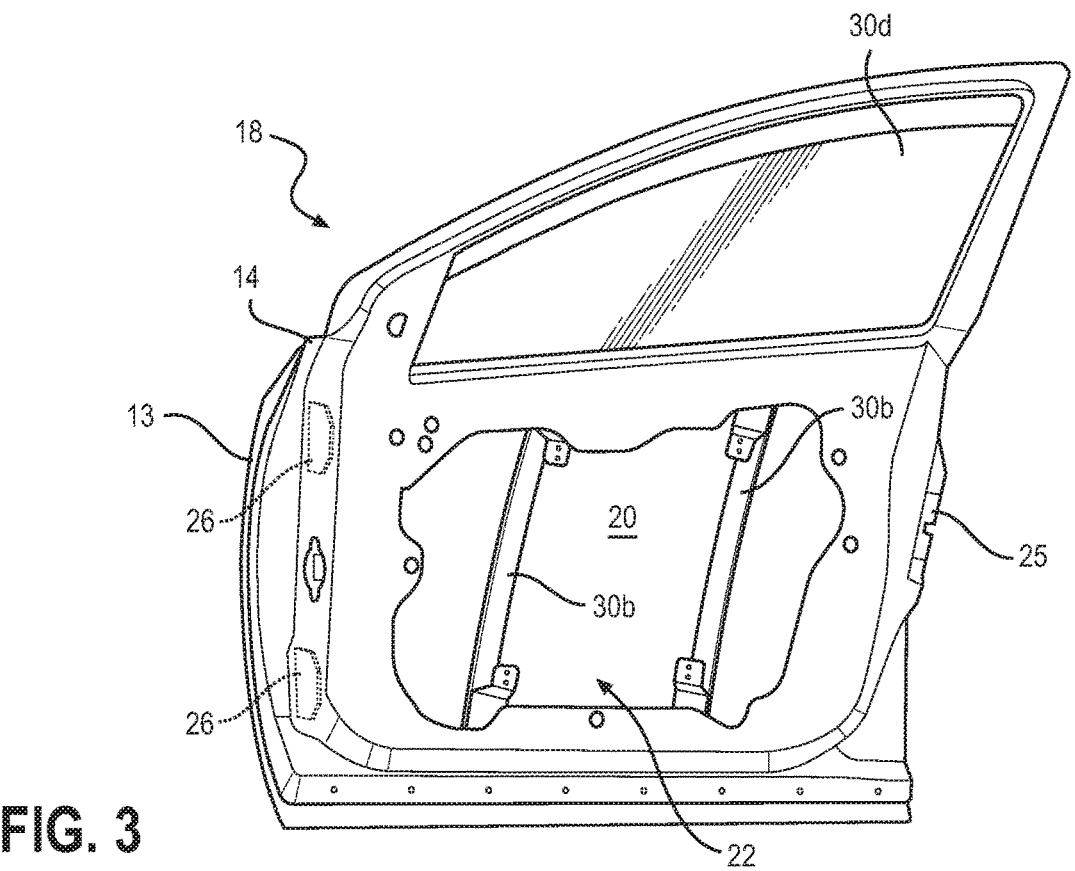

The outer panel 13 forms at least part of the exterior surface of the door assembly 10. The inner panel 14 provides a structural member for the mounting of one or more trim pieces that form an inner surface of the door assembly 10. Some of the inner panel 14 may itself also form part of the inner surface of the door assembly 10. The inner and outer panels are connected together and together form a door panel structure 18 that contains an internal door cavity 20 (FIG. 3). An opening 22 in the door panel structure 18 provides access to the internal door cavity 20.

The outer and inner panels 13 and 14 may be made from any suitable material or combination of materials. For example, the outer and inner panels 13 and 14 may both be made from a suitable metal (e.g. a suitable steel). In another example, the outer panel 13 may be made from a suitable polymeric or composite material (e.g. fiberglass) and the inner panel may be made from a suitable metal.

Figure 5A:
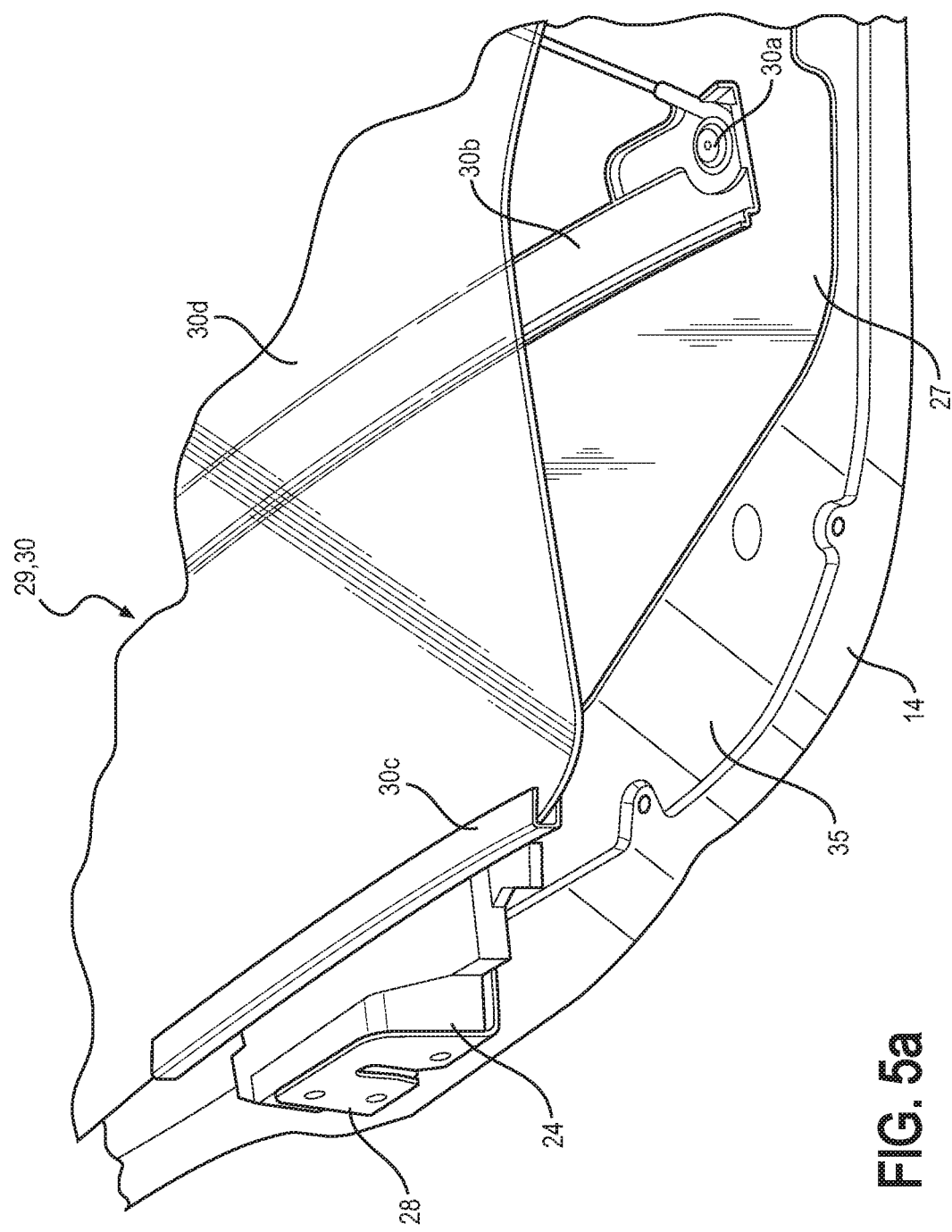
Figure 5B:
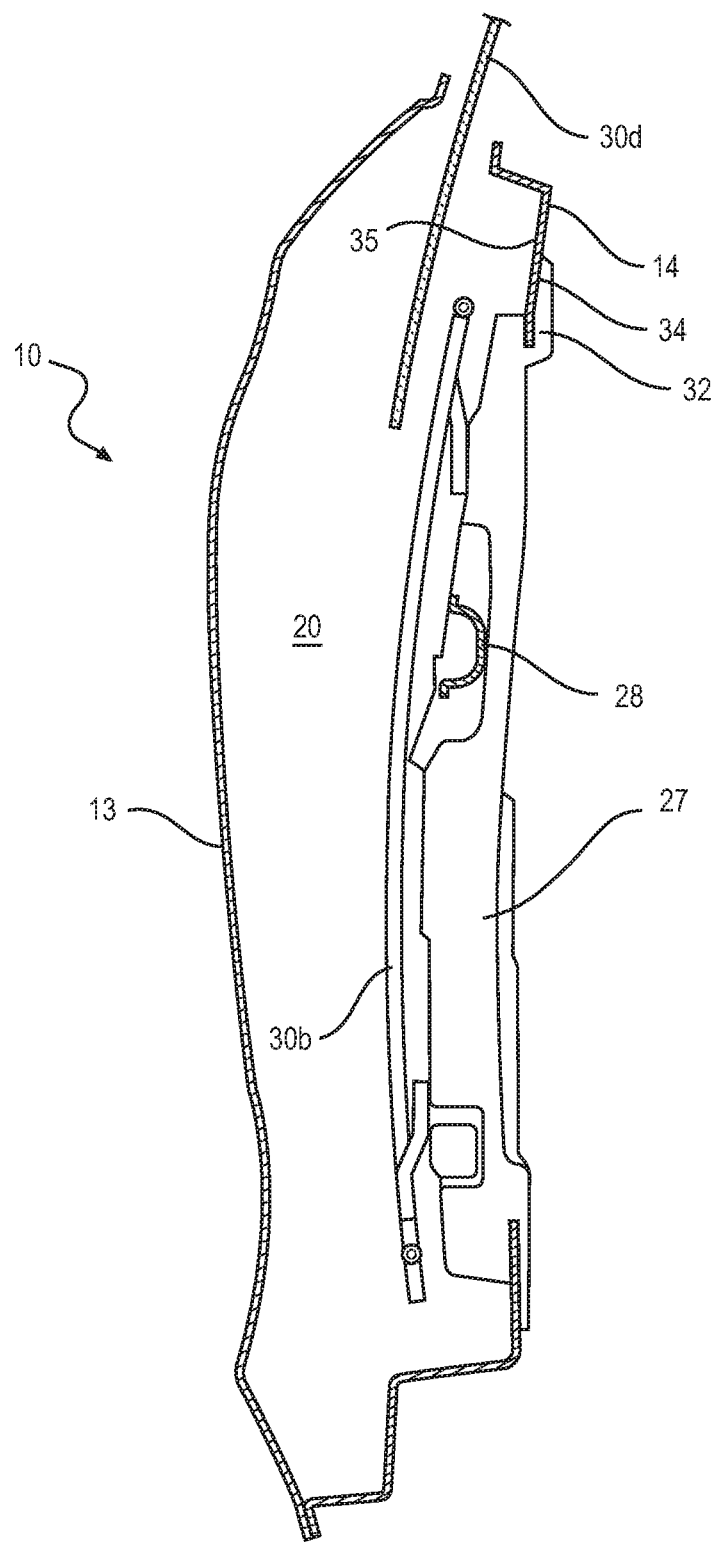
Figure 5C:
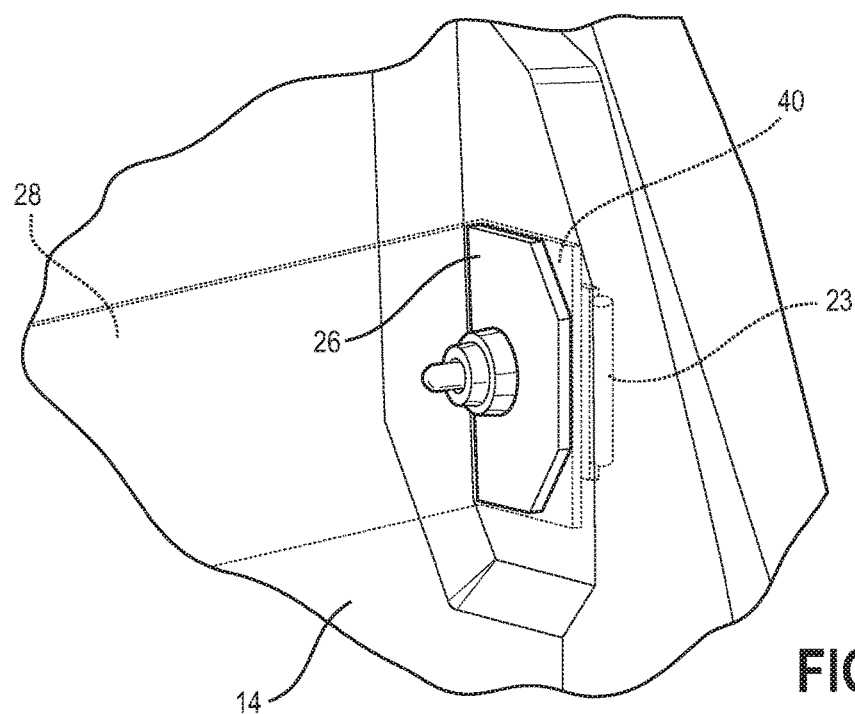

A pair of hinges 23 (one of which is shown in FIG. 5c) are connected to the door panel structure 18 and pivotally mount the front end of the door panel structure 18 (and the door assembly 10) to the vehicle body 11. A door latch 24 (FIG. 2) is mounted to the rear end of the door panel structure 18 to permit the releasable closure of the door assembly 10 against the vehicle body 11. The hinges 23 and the door latch 24 acts as force transfer members through which forces in the door assembly 10 are transmitted to the vehicle 11. Such forces include, for example, side-impact forces from a vehicle colliding with the vehicle 12.

Referring to FIG. 3, at least one of the outer and inner panels 13 and 14 includes a latch reinforcement structure 25 that engages the door latch 24 and transmits forces in the door panel structure 18 thereto for transmission out of the door assembly 10 and into the vehicle body 11. The latch reinforcement structure 25 may simply be made up of a relatively thick metal plate that supports the door latch 24. Similarly, at least one of the outer and inner panels 13 and 14 includes a hinge reinforcement structure 26 that engages the hinges 23 and transmits forces in the door panel structure 18 thereto for transmission out of the door assembly 10 and into the vehicle body 11. The hinge reinforcement structure 26 may simply be made up of one or more relatively thick metal plates that support the hinges 23. Thus, side impact forces incurred by the door assembly 10 can be transferred to the vehicle body 11 through the door latch 24 and the hinges 23.

Figure 4A:
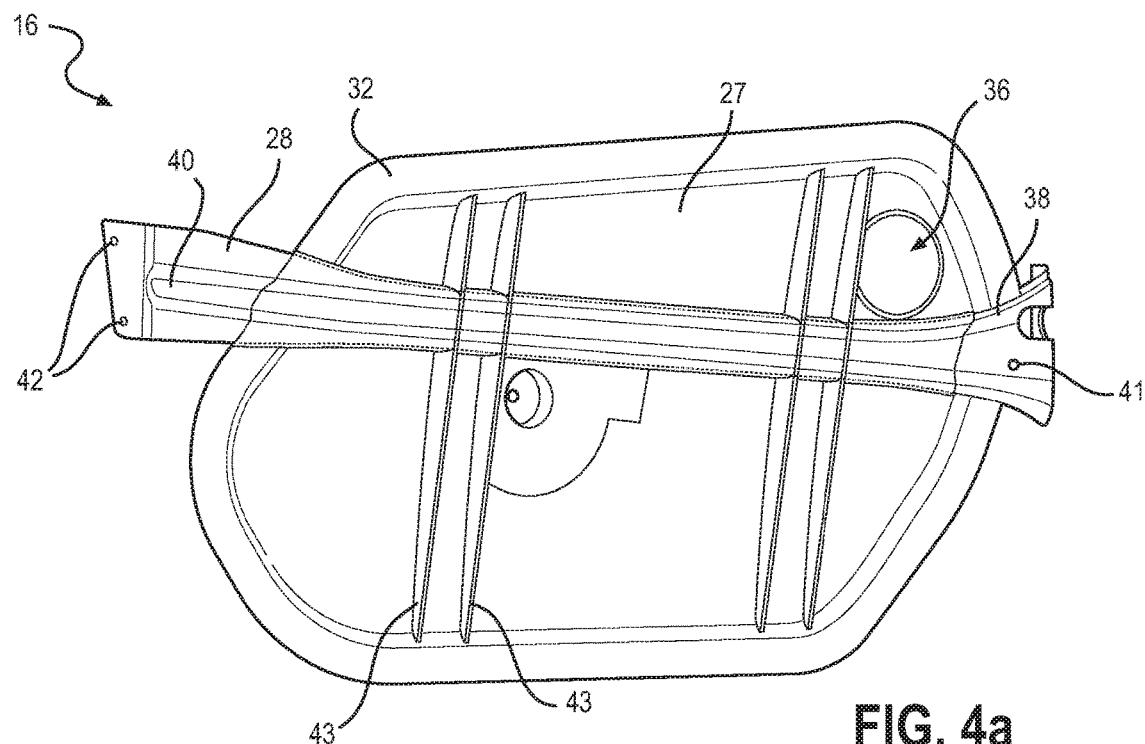
Figure 4B:
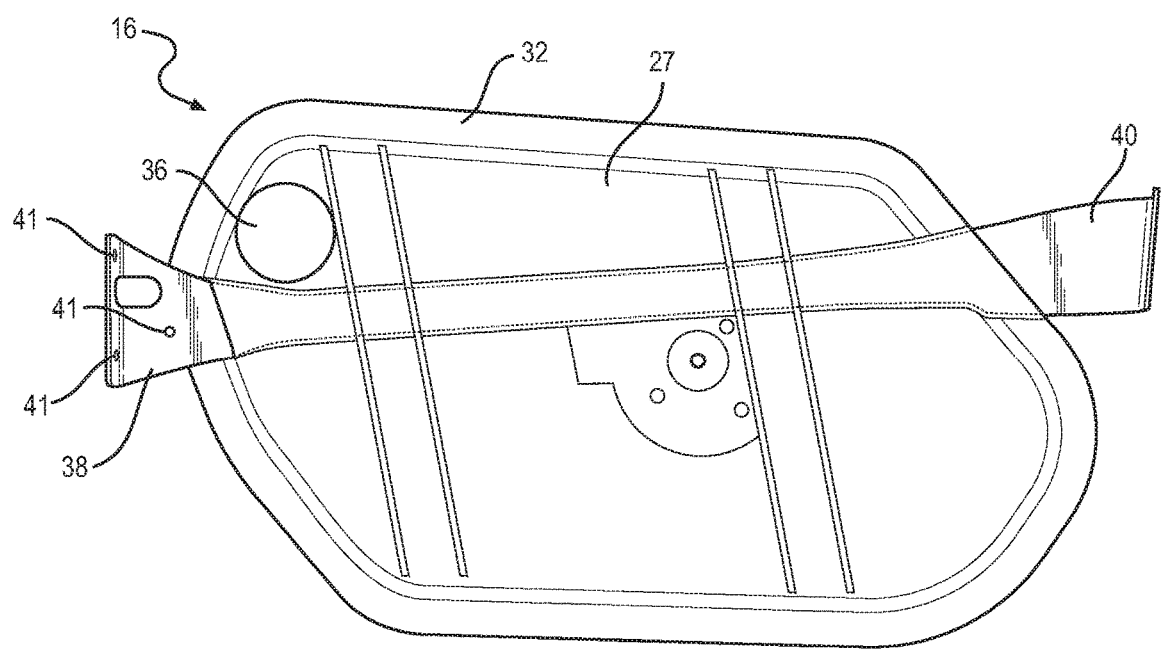

The carrier/intrusion member assembly 16 includes a carrier 27 (FIGS. 4a and 4b), an intrusion member 28 and a plurality of door hardware components 29 (FIG. 5a) including, for example, components from a window regulator shown at 30 (e.g. a motor driven cable drum (not shown), pulleys and cable guides (shown at 30a), lifter plates (not shown), window regulator rails (shown at 30b), and glass run channels (shown at 30c) for guiding the window (shown at 30d)). Other door hardware components 29 may include, for example, a speaker (not shown) for outputting sound from the vehicle's stereo system (not shown). The positions of the window regulator rails 30b are shown in FIG. 3 also.

Figure 2:
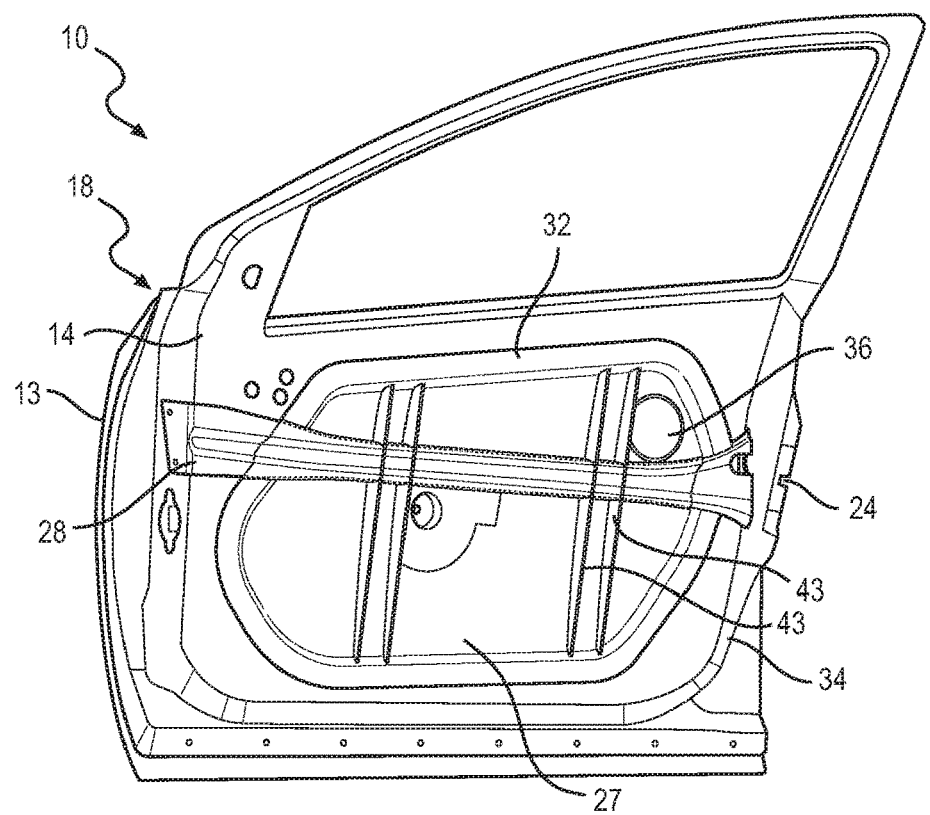

Referring to FIG. 5a, the carrier 27 is a one-piece plate or panel that holds a plurality of the aforementioned door hardware components 29 and is installing in position on the door panel structure 18 so that all of the attached door hardware components 29 are automatically in their necessary positions for operation. The carrier 27 may be made from a polymeric material or a metallic material. The carrier 27 mounts to the door panel structure 18 in such a way that the door hardware components 28 extend through the opening 22 in the door panel structure 18 into the internal door cavity 20. Referring to FIG. 2, the carrier 27 has a peripheral edge 32 that sealingly engages the inner panel 14 to prevent the leakage of moisture therepast. In the embodiment shown, the peripheral edge 32 engages the inner face of the inner panel 14, (shown at 34 in FIG. 5b), however it will be understood that the carrier 27 could alternatively mount entirely or partially to the outer face of the inner panel 14 (shown at 35 in FIG. 5b).

Referring to FIG. 2, the carrier 27 includes an access aperture 36 that permits access to the components 28 in the internal door cavity 20 after the carrier 27 has been mounted to the door panel structure 18. After installation of components in the internal door cavity 20 is complete, the access aperture 36 may be closed by some suitable member to prevent moisture from leaking therepast.

The intrusion member 28 is a member that strengthens the door assembly 10, and in particular increases the resistance of the door assembly 10 to intrusion into the vehicle cabin from a side-impact (e.g. from another vehicle colliding with the vehicle 12). The intrusion member 28 may be made from any suitable material, such as a suitable metallic material.

The intrusion member 28 has a first end 38 and a second end 40. In the embodiment shown, the first and second ends 38 and 40 of the intrusion member 28 extend past the peripheral edge of the carrier 32, thereby facilitating the mounting of the intrusion member 28 directly to the door panel structure 18. This permits the intrusion member 28 to better assist the door assembly 10 in resisting deformation inwards from a side impact than if the intrusion member 28 were simply mounted to the carrier 27 only and not directly to the door panel structure 18.

In a particularly advantageous embodiment, shown in FIGS. 5a, 5b and 5c, the first and second ends 38 and 40 of the intrusion member 28 have first and second mounting features 41 and 42 at the first and second ends 38 and 40 are connected to (and thus engage) the latch reinforcement structure 25 and the hinge reinforcement structure 26 respectively. For this reason, the first end 38 of the intrusion member 28 may be referred to as a hinge end 38 in some embodiments, and the second end 40 may be referred to as a latch end in some embodiments. The first and second mounting features 41 and 42 may comprise one or more apertures for the pass-through of mechanical fasteners, side edge surfaces that are used for welding, a bottom surface that is used for bonding, or any other type of feature. As a result of being engaged with the latch reinforcement structure 25 and the hinge reinforcement structure 26, the intrusion member 28 transmits side-impact forces incurred by the door assembly 10 to them and therefore out of the door assembly 10 into the vehicle body 11 through them. As a result, the vehicle body 11 itself assists in resisting deformation of the door assembly 10 from a side impact.

The connection between the first and second ends 38 and 40 of the intrusion member 28 and the latch reinforcement structure 25 and the hinge reinforcement structure 26 may be by any suitable means, such as by welding, bonding, and/or by mechanical fasteners.

From an ease-of-assembly point of view, however, by providing the carrier/intrusion member assembly 16 (i.e. by providing the intrusion member 28 with the carrier 27), the installation of the carrier 27 with all of the door hardware components 29 mounted thereto is facilitated as compared to some prior art door assemblies in which the carrier assembly with the door hardware components must be installed onto a door panel structure with an intrusion member already connected to the door panel structure. It can be difficult to maneuver the carrier assembly into place without interference occurring between a pre-installed intrusion member and the door hardware components (which can in some circumstances damage some of the door hardware components).

While the carrier 27 itself mounts to the door panel structure 18 in the embodiments shown herein, it is possible in an alternative embodiment for the carrier 27 to be sufficiently solidly connected to the intrusion member 28 and to not require direct mounting to the door panel structure 18.

The connection between the carrier 27 and the intrusion member 28 may be by any suitable means. For example, in the embodiment shown in FIGS. 4a and 4b the carrier 27 is overmolded on the intrusion member 28.

By virtue of a rigid connection between the carrier 27 and the intrusion member, as is provided by overmolding, the intrusion member 28 can add rigidity to the carrier 27, so that the carrier 27 can better act as a structural component of the door assembly 10 so as to help inhibit door sag and the like.

To assist in the transfer of forces between the carrier 27 and the intrusion member 28, there may be provided a set of strengthening ribs 43 molded into the carrier 27 that extend across the intrusion member 28.

Figure 6:
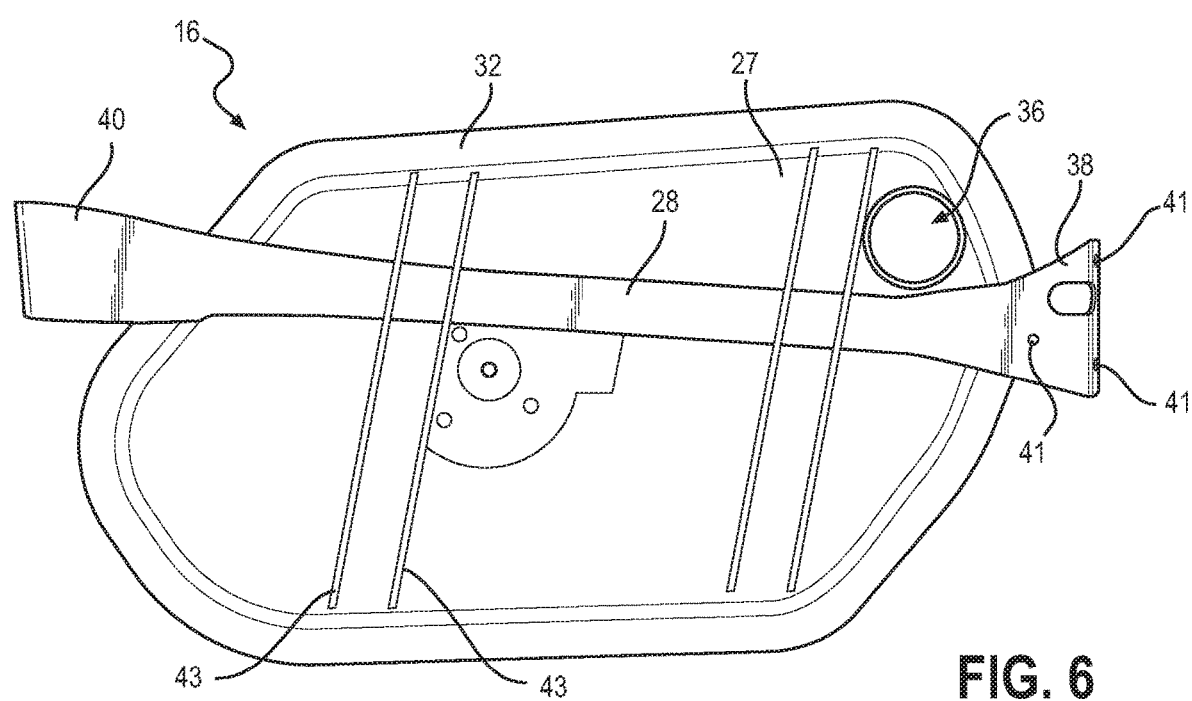

In other embodiments, the intrusion member 28 may connect to the carrier 27 in other ways. For example, as shown in FIG. 6, the carrier 27 may include preformed slots in the strengthening ribs 43, which permit the pass-through (e.g. from left to right), so as to loosely connect the intrusion member 28 to the carrier 27.

Figure 7:
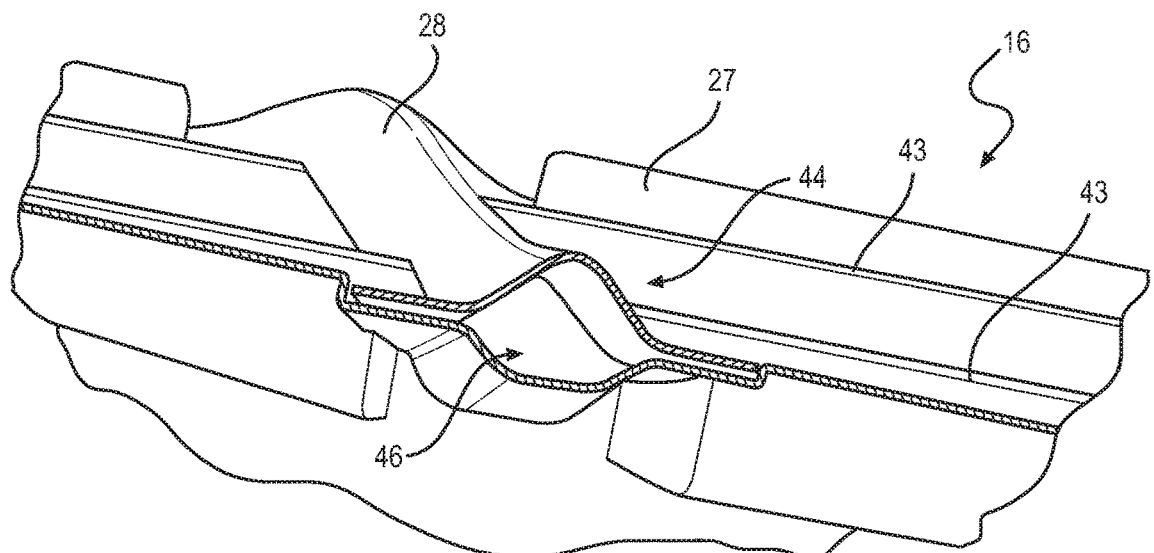

In yet another embodiment, the intrusion member 28 may connect to the carrier 27 by a snap-fit connection, such as is shown in FIG. 7.

In some embodiments, such as the embodiment shown in FIG. 7, the intrusion member 28 may cooperate with the carrier 27 to form a hollow structure 44 that contains a carrier/intrusion member cavity 46. By forming a hollow structure, particularly when the carrier 27 and the intrusion member 28 are connected fixedly enough to be able to transmit bending stresses to one another, the resistance to deformation of the hollow structure can be significantly higher than if the carrier 27 and intrusion member 28 are connected with no hollow structure formed therebetween.

Figure 8:
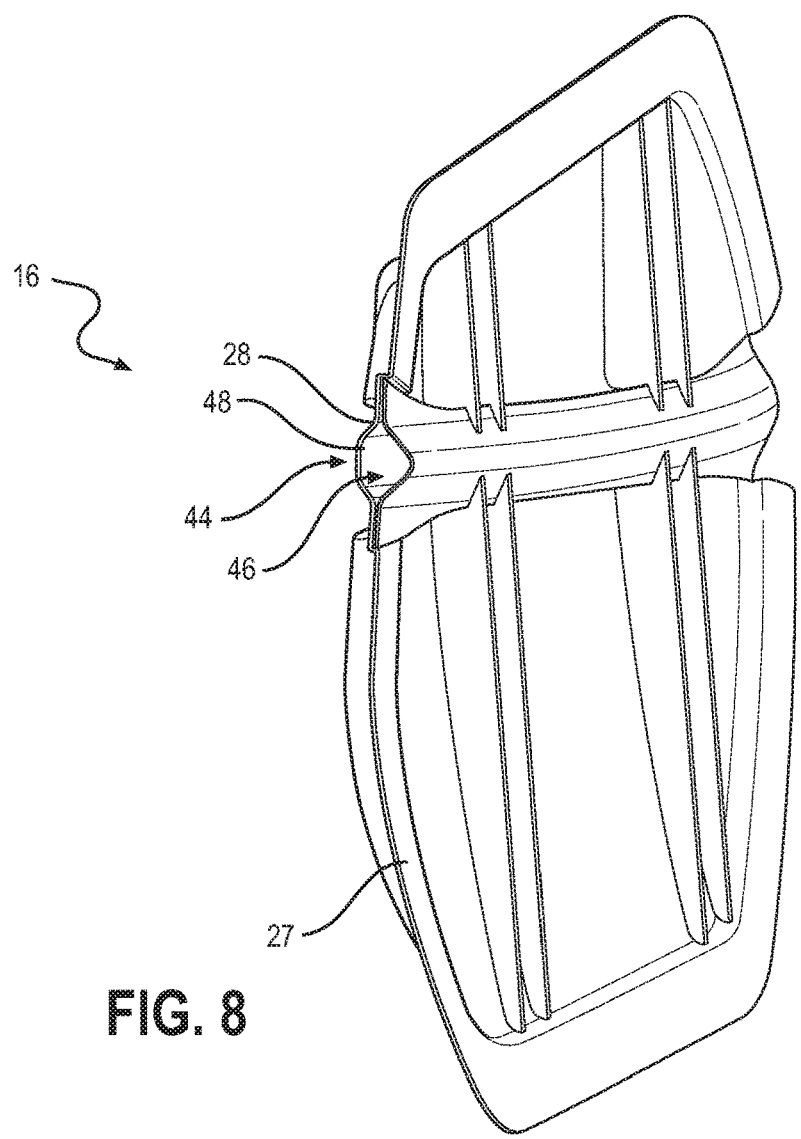

Optionally, as shown in FIG. 8, the carrier/intrusion member cavity 46 may contain (and is preferably substantially filled with) an energy absorption material 48. The energy absorption material may be any suitable type of material. For example, it may be aluminum foam, or alternatively magnesium foam or a polymeric foam. The term aluminum is meant to include both pure aluminum and aluminum alloys. Similarly, the term magnesium is intended to include both pure magnesium and magnesium alloys.

The energy absorption material 48 may be provided initially in the form of a solid, preformed member. In embodiments wherein the carrier 27 is preformed and then connected to the intrusion member 28, the solid preformed member made up of energy absorption material 48 can be inserted between the carrier 27 and the intrusion member 28 as they are being joined together. Alternatively, the energy absorption material 48 may be provided initially in the form of a flowable (e.g. molten) material that may be injected into the cavity 46 and which may be hardened, by any suitable means thereafter (e.g. by simply allowing it to cool). The energy absorption material acts to further dissipate energy from a side-impact thereby further reducing the degree of intrusion into the passenger compartment of the vehicle 12 that might occur from a side-impact. The passenger compartment is shown at 50 in FIG. 1.

Figure 9:
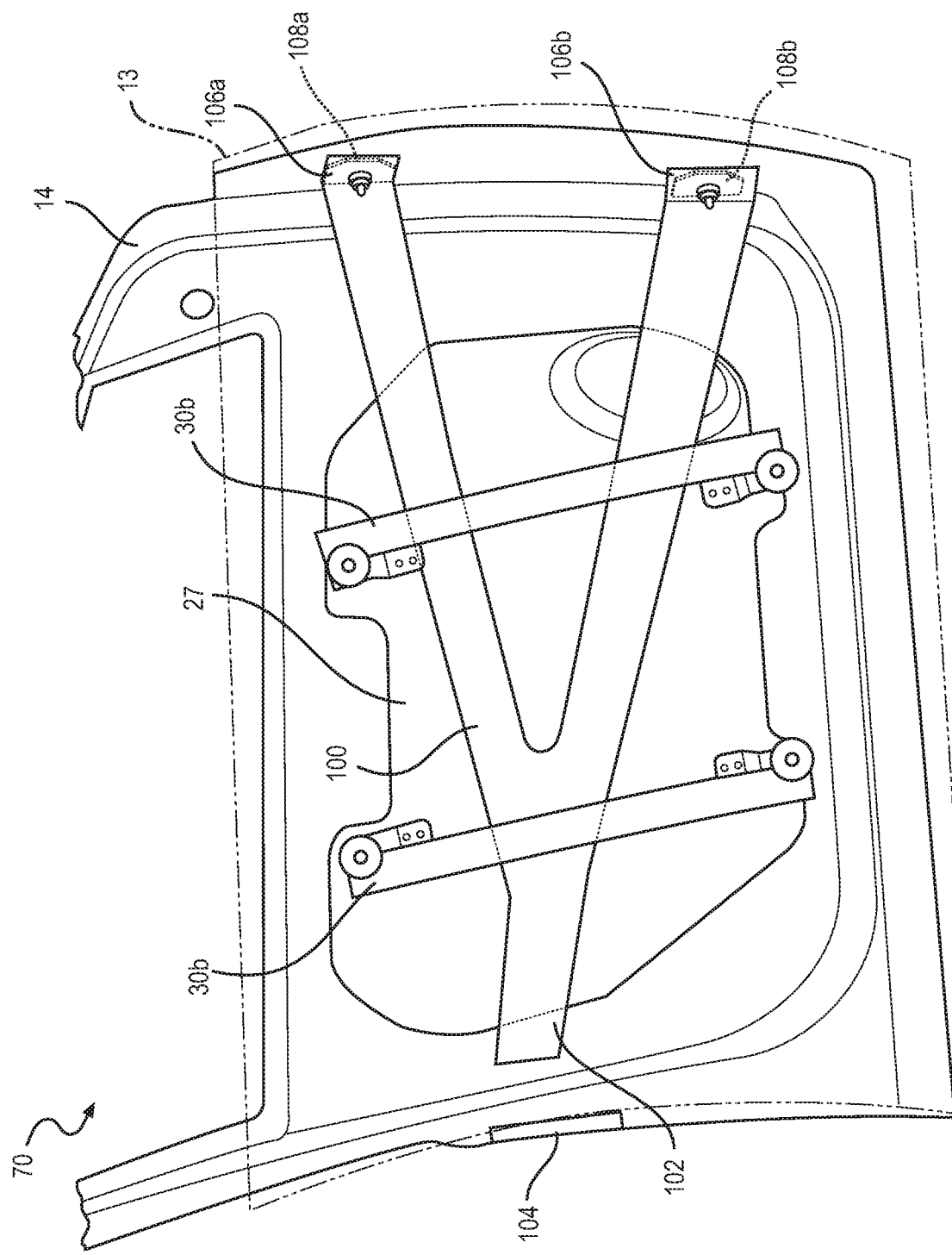

FIG. 9 illustrates a door assembly 70 in accordance with another embodiment of the present invention in which the intrusion member, shown at 100, has one first or "latch" end 102 connected to a latch reinforcement structure and the latch, shown at 104, and two second or "hinged" ends 106a and 106b that connect to the hinge reinforcement structures and the hinges shown at 108a and 108b respectively.

Figure 10:
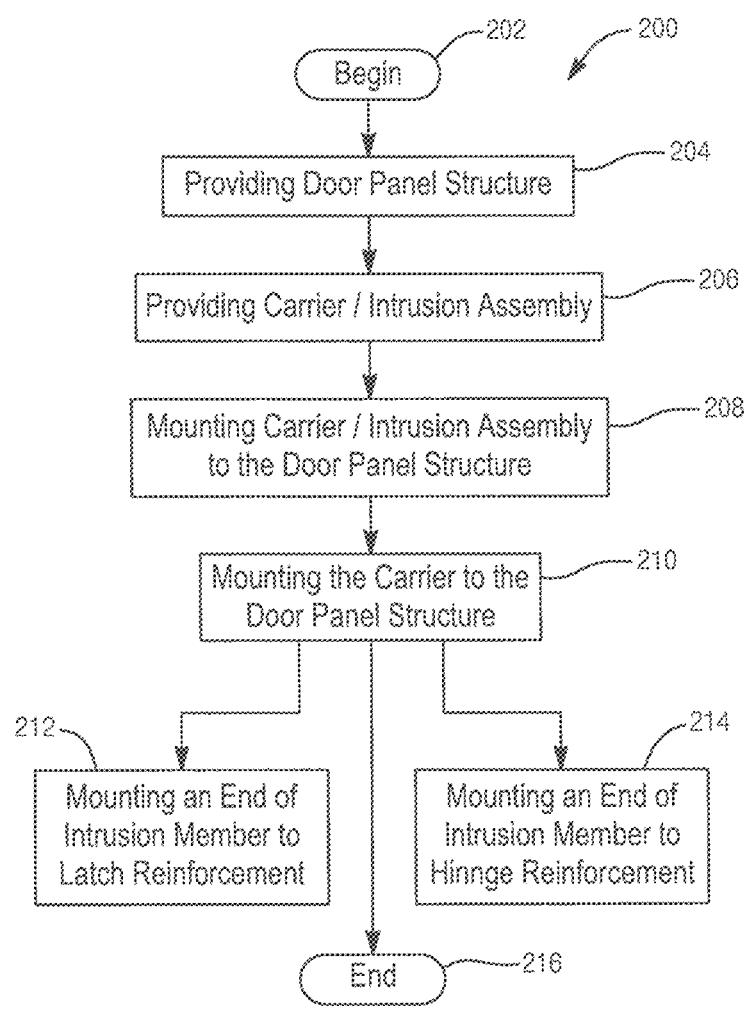

FIG. 10 illustrates a method 200 of making the door assembly 10, 70 in accordance with an embodiment of the present invention. The method 200 begins at 202. Step 204 includes providing a door panel structure, such as structure 18 and which includes an outer panel, such as outer panel 13 and an inner panel such as inner panel 14 connected together and together defining a door cavity, such as internal door cavity 20, between the inner and outer panels. Step 206 includes providing a carrier/intrusion member assembly, such as assembly 16, which includes a carrier such as carrier 27, an intrusion member (such as member 28) connected to the carrier, and a plurality of door hardware components (such as components 29 and 30) mounted to at least one of the carrier and the intrusion member. Step 208 includes mounting the carrier/intrusion member assembly to the door panel structure at least in part by mounting the intrusion member to the door panel structure. After step 208 the hardware components extend into the internal door cavity 20. The method 200 may further include step 210, which includes mounting the carrier to the door panel structure. Step 208 may optionally include step 212 which is mounting an end (i.e. a first end) of the intrusion member to the latch reinforcement structure. Alternatively or additionally, step 208 may optionally include step 214 which is mounting another end (i.e. a second end) of the intrusion member to the hinge reinforcement structure. Optionally, step 206 may include, providing the intrusion member, and overmolding the carrier over the intrusion member. The method ends at 216.

Optionally, the carrier and the intrusion member may together define a carrier/intrusion member cavity. The method 200 may further include step 218 which is providing an energy absorption material in the carrier/intrusion member cavity, which may entail providing a flowable material; injecting the flowable material into the carrier/intrusion member cavity; and hardening the flowable material to form the energy absorption material.

Figure 11:
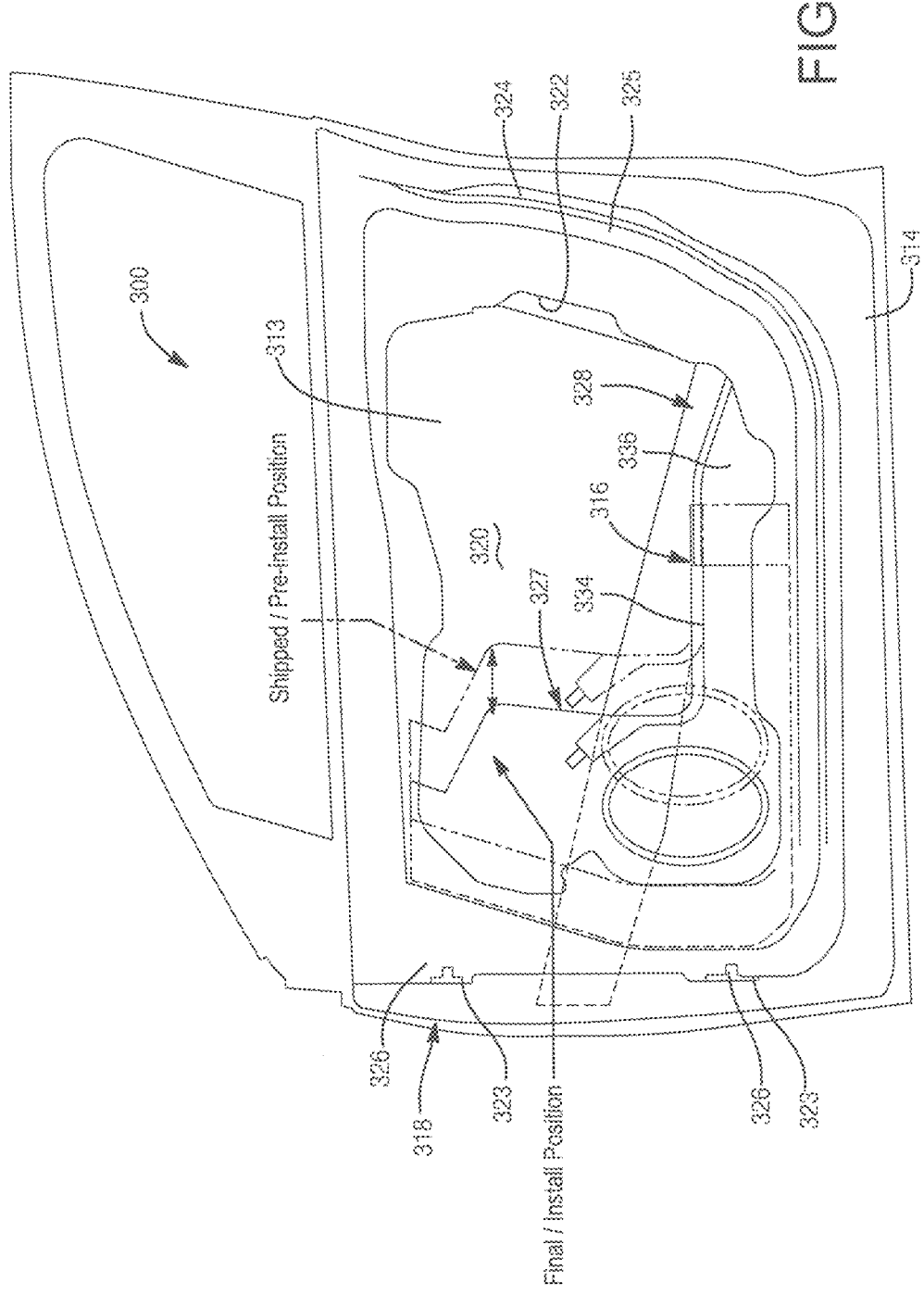
Figure 12:
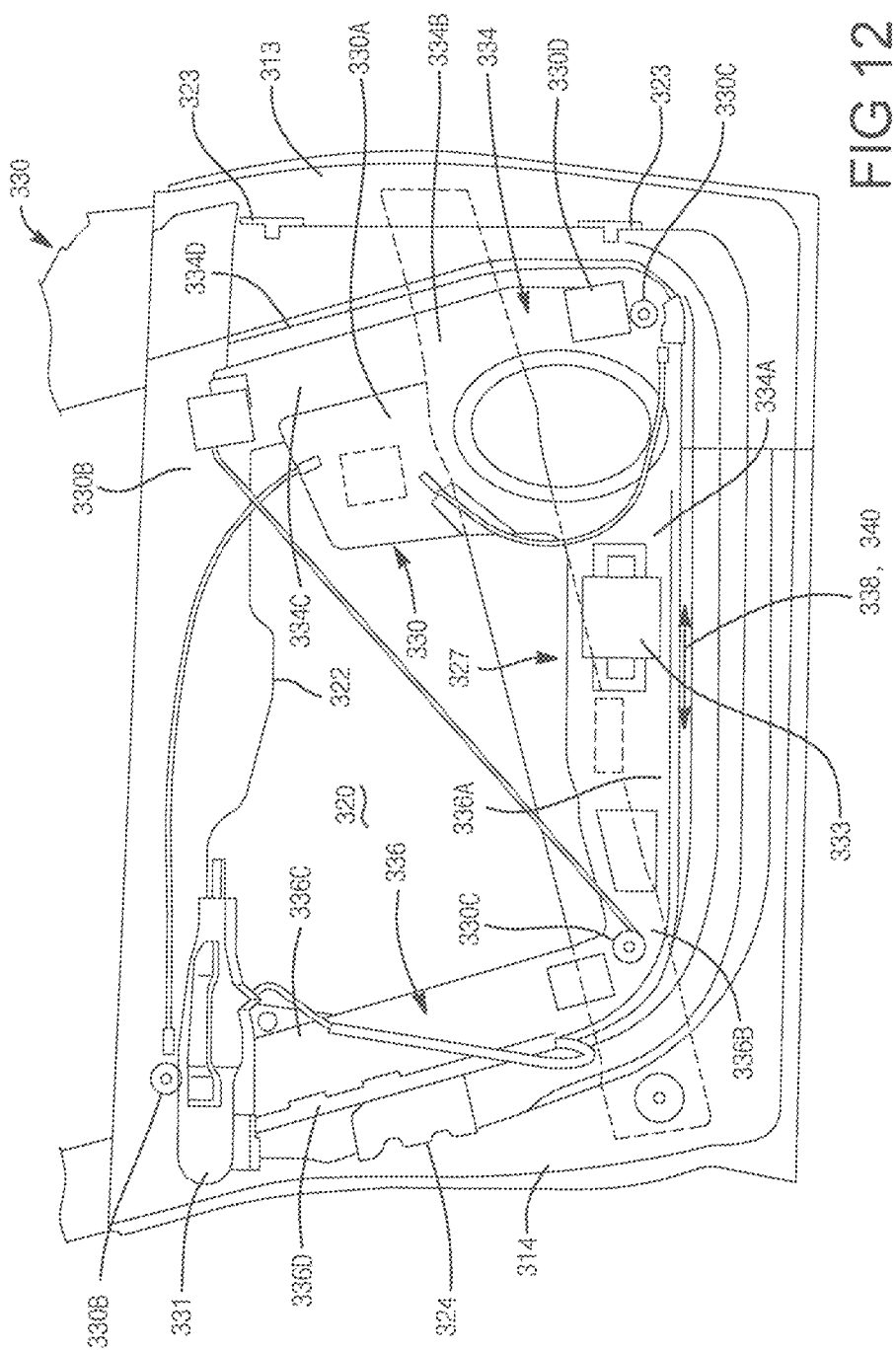

Referring now to FIGS. 11 and 12, a door assembly 300 is illustrated which is configured to be mounted to body 11 of motor vehicle 12 (FIG. 1). Door assembly 300 includes an outer panel 313, an inner panel 314, an intrusion member 328 and a collapsible carrier module 316. The production of door assembly 300 is facilitated directly as a result of carrier module 316 including a collapsible carrier plate 327, the structure and function of which will be detailed with greater specificity hereinafter.

Outer panel 313 forms at least part of the exterior surface of door assembly 300. Inner panel 314 provides a structural member for the mounting of one or more trim pieces that form an inner surface of door assembly 300. Some of inner panel 314 may itself also form part of the inner surface of door assembly 300. The inner and outer panels are connected together and together form a door panel structure 318 that contains an internal door cavity 320. An opening 322 in door panel structure 318 provides access to internal door cavity 320.

Outer and inner panels 313 and 314 may be made from any suitable material or combination of materials. For example, outer and inner panels 313 and 314 may both be made from a suitable metal (e.g. a suitable steel). In another example, outer panel 313 may be made from a suitable polymeric or composite material (e.g. fiberglass) and the inner panel may be made from a suitable metal.

A pair of hinges 323 are connected to door panel structure 318 and pivotally mount the front end of door panel structure 318 (and door assembly 300) to vehicle body 11. A door latch 324 is mounted to the rear end of door panel structure 318 to permit the releasable closure of door assembly 300 against vehicle body 11. Hinges 323 and door latch 324 act as force transfer members through which forces in door assembly 300 are transmitted to vehicle 11. Such forces include, for example, side-impact forces from a vehicle colliding with the vehicle 12.

Referring primarily to FIG. 11, at least one of outer and inner panels 313 and 314 includes a latch reinforcement structure 325 that engages door latch 324 and transmits forces in door panel structure 318 thereto for transmission out of door assembly 300 and into vehicle body 11. Latch reinforcement structure 325 may simply be made up of a relatively thick metal plate that supports door latch 324. Similarly, at least one of outer and inner panels 313 and 314 includes a hinge reinforcement structure 326 that engages hinges 323 and transmits forces in door panel structure 318 thereto for transmission out of the door assembly 300 and into vehicle body 11. Hinge reinforcement structure 326 may simply be made up of one or more relatively thick metal plates that support hinges 323. Thus, side impact forces incurred by door assembly 300 can be transferred to vehicle body 11 through door latch 324 and hinges 323.

With particular reference to FIG. 12, carrier module 316 is shown to include a collapsible carrier plate 327 and a plurality of door hardware components 329 mounted to carrier plate 327. In this non-limiting example, door hardware 329 includes a power-operated window regulator 330 having an electric motor-driven cable (shown schematically at 330A), a pair of upper pulleys 330B and lower pulleys 330C, a pair of lifter plates 330D for moving a window (not shown) within a pair of glass run channels formed integrally as part of the window regulator rails associated with carrier plate 327. Other hardware components may include a speaker (not shown). An outside handle 331 mounted to door structure 318 is electrically and/or mechanically connected to latch 324. A door control unit 333 is shown mounted to a lower base segment of carrier plate 327 and controls operation of window lift actuator 330a and any power-operated actuator associated with latch 324.

In accordance with a non-limiting embodiment, carrier plate 327 is a two-piece panel assembly configured to hold a plurality of the aforementioned powered actuators and door hardware components and which is adapted to be installed within internal door cavity 320 via opening 322 formed in inner door panel 314 so that, upon installation, all attached hardware components are located in position for operation. Referring to FIGS. 11-14, carrier plate 327 is shown to generally include a first carrier member 334, a second carrier member 336 interconnected to first carrier member 334 via a sliding connection arrangement 338, and a locking mechanism 340 operably associated with connection arrangement 338. In particular, first carrier member 334 includes a first base segment 334A, a first body segment 334B, and a first window regulator rail segment 334C defining a first glass run channel 334D that is alignable along a first pillar (i.e. the A-pillar) of door structure 318. First rail segment 334C extends transversely with respect to first base segment 334A. Second carrier member 336 includes a second base segment 336A, a second body segment 336B, and a second window regulator rail segment 336C defining a second glass run channel 336D that is alignable with a second pillar (i.e. the B-pillar) of door structure 318. Second rail segment 336C extends transversely with respect to second base segment 336A.

Figure 13:
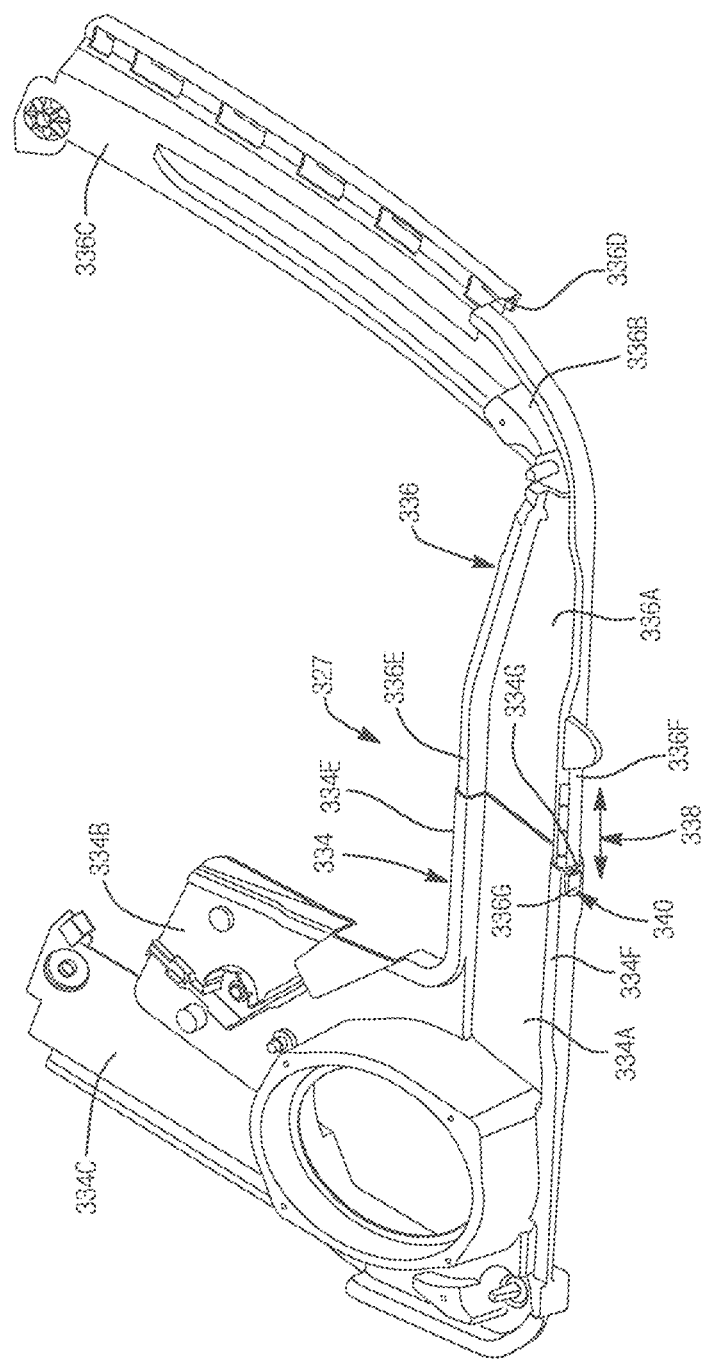

Referring primarily to FIGS. 13 and 14, collapsible carrier plate 327 is shown prior to assembly of the various door hardware components thereon and removed from cavity 320 of door assembly 300 to better illustrate its structure and features. FIG. 13 illustrates carrier plate 327 from a "dry side" view (looking from inside of door assembly 300), while FIG. 14 illustrates carrier plate 327 from a "wet side" view (looking from outside of door assembly 300). First base segment 334A and second base segment 336A are interconnected via sliding connection arrangement 338 to permit relative movement therebetween between a first or retracted position and a second or extended position. The retracted position established between first and second carrier members 334, 336 of carrier plate 327 is best identified by line "A" in FIG. 14. In contrast, the extended position established between the first and second carrier members 334, 336 of carrier plate 327 is best illustrated by line "B" in FIG. 14.

FIG. 13 illustrates carrier plate 327 in its extended position such that locking mechanism 340 interacts with sliding connection arrangement 338 so as to establish a rigid coupling (i.e. axial retention feature) between first base segment 334A and second base segment 336A, thereby preventing subsequent axial movement toward the retracted position. With carrier plate 327 in its retracted position, a pre-installed/collapsed configuration is established for carrier module 316 which facilitates installation thereof into internal door cavity 320 through door opening 322. Following installation within internal door cavity 320, carrier plate 327 is moved into its extended position to establish a post-installed/assembled configuration. Thereafter, portions of each carrier member 334, 336 are securely fastened (i.e. via rivets, fasteners, etc.) to complementary portions of inner panel 314 and/or portions of door panel structure 318. This installed arrangement is best shown in FIG. 12.

Sliding connection 338 is best seen in FIG. 13 to include a pair of elongated guide tubes 334E, 334F formed along opposite lateral edges of first base segment 334A and which are adapted to slideably receive a corresponding pair of edge rails 336E, 336F formed along opposite lateral edges of second base segment 336A to provide a telescopic relationship therebetween. Locking mechanism 340 includes, in this non-limiting example, a pair of cam tabs 336G each formed to extend outwardly from a corresponding one of edge rails 336E, 336F and which are configured to "snap" into retention windows 334G formed in guide tubes 334E, 334F.

Thus, once carrier members 334, 336 are located with carrier plate 327 in its extended position, engagement of tabs 336G in retention windows 334G prevents further axial movement in either of an extension or retraction direction. Obviously, the present disclosure contemplates any type of equivalent sliding connection arrangement and locking mechanism capable of providing the above-described features and function. As will also be noted, first body segment 334B of first carrier member 334 provides a speaker mount tube and mounting structure for one for of the lower pulleys 330C and window regulator actuator 330A. Integrated first window regulator rail segment 334C of first carrier member 334 provides a mounting for one of the upper pulleys 330B and further defines elongated first glass run channel 334D along its outboard edge. Similarly, second body segment 336B of second carrier member 336 provides a mount for the other one of the lower pulleys 330C while second window regulator rail segment 336C defines a mount for the other one of the upper pulleys 330B as well as defines elongated second glass run channel 336D along its outboard edge. While not shown, channel seals would be installed in each of elongated glass run channels 334D, 336D and provide a seal relative to the window (not shown) mounted therein. Glass run channels 334D, 336D are each configured as C-shaped open guide channels to facilitate movement of the window between its open and closed positions.

With particular reference now to FIGS. 15 and 16, an alternative embodiment of a collapsible carrier plate 327A is illustrated and which can be substituted for carrier plate 327 for installation with a carrier module 316A within internal cavity 320 of door 300. In general, carrier plate 327A is configured to utilize a pivotable movement instead of a translational movement between a pair of carrier members to establish the pre-installed/collapsed arrangement as well as the post-installed/assembled arrangement. In particular, carrier plate 327A is configured to generally include a first carrier member 434, a second carrier member 436 interconnected to first carrier member 434 via a hinged-pivot connection arrangement 438, and a locking mechanism 440 operably associated with pivot connection arrangement 438. First carrier member 434 includes a first base segment 434A, a first body segment 434B, and a first window regulator rail segment 434C having a first glass run channel 434D that is alignable with a first pillar (i.e. the A-pillar) of door structure 318. Second carrier member 436 includes a second base segment 436A and a second window regulator rail segment 436C having a second glass run channel 436D that is alignable with a second pillar (i.e. the B-pillar) of door structure 318.

First base segment 434A and second base segment 436A are interconnected via hinged-pivot connection 438 to permit relative rotational movement therebetween so as to permit second rail segment 436C to move relative to first base segment 434A between a first or closed position and a second or open position. The closed position is identified in FIG. 15 via line "C" while the open position is identified via line "D". Location of second rail segment 436C in its closed position relative to first base segment 434A establishes the pre-installed/collapsed arrangement for collapsible carrier plate 327A. In contrast, location of second rail segment 436C in its open position relative to first base segment 434A establishes the post-installed/assembled arrangement for collapsible carrier plate 327A. A snap-lock locking mechanism is shown schematically by block 440 but is intended to identify any suitable locking mechanism operable to latch second rail segment 436C in its open position following installation into door cavity 320 via opening 322. The remaining structure and function of carrier 327A is generally similar to that of carrier 327 previously described in detail.

As noted, FIGS. 12-14 illustrate a first version of a collapsible carrier plate 327 utilizing a sliding connection arrangement 338 and a locking mechanism 340 to move first and second carrier members 334, 336 axially between retracted and extended position. Likewise, FIGS. 15-16 illustrate a second version of a collapsible carrier plate 327A utilizing a hinged-pivot connection arrangement 438 and a locking mechanism 440 for facilitating pivotal movement of second carrier member 436 relative to first carrier member 434 between open and closed positions. While collapsible carrier plate 327 of FIGS. 12-14 includes two distinct carrier members 334, 336 interconnected via a telescopic-type sliding connection 338, collapsible carrier plate 327A of FIGS. 15 and 16 may include either individual carrier members 434, 436 connected via a pivot-type connection 438 or carrier members 434', 436' formed as a unitary component and utilizing an integral hinge-type connection 438' therebetween. It should also be recognized by those skilled in the art that a third or "hybrid" version of a two-member carrier plate can utilize a sliding connection and first locking mechanism to interconnect base segments of first and second carrier members for axial relative movement and a hinged-pivot connection and second locking mechanism to interconnect the base segment of the second carrier member to a rail segment of the second carrier member to provide another collapsible carrier module embodiment. The combination of both axial and pivotal movements between portions of the two-member carrier plate provides further opportunity to utilize collapsible carrier modules in smaller door assemblies.

Referring now to FIGS. 17-21, another embodiment of a collapsible carrier module 316B for installation in door assembly 300 is disclosed. FIG. 17 shows collapsible carrier module 316B to include a two-piece carrier plate 327B equipped with many of the same components (i.e. door hardware, power-operated window regulator, latch, etc.) associated with two-piece carrier plate 327 shown in FIG. 12. In this regard, common reference numerals are used hereinafter to identify previously disclosed components. Two-piece carrier plate 327B is generally similar to carrier plate 327 of FIGS. 12-14 and is shown to now include a first carrier member 334', a second carrier member 336' connected to first carrier member 334' via a sliding connection arrangement 338', and a locking arrangement 340'. However, two-piece carrier plate 327B has been modified to include a pair of laterally-spaced integrated window regulator rail features in addition to glass run channels 334D and 336D.

First carrier member 334' includes a first base segment 334A, a first body segment 334B, and a first window regulator rail segment 334C defining a first glass run channel 334D and a first slider rail 334H which are both alignable along a first pillar (i.e. the A-pillar) of door structure 318 of door assembly 300. First slider rail 334H is an elongated, raised projection extending outwardly from first window regulator rail segment 334C of first carrier member 334'. First slider rail 334H is configured to support a first one of a pair of window lifter plates 330D' for sliding translational movement required for moving the window W between its open and closed positions. Second carrier member 336' includes a second base segment 336A, a second body segment 336B, and a second window regulator rail segment 336C defining a second glass run channel 336D and a second slider rail 336H which are both alignable with a second pillar (i.e. the B-pillar) of door structure 318. Second slider rail 336H is an elongated, raised projection extending from an edge surface of second window regulator rail segment 336C of second carrier member 336'. Second slider rail 336H is configured to support a second one of the pair of window lifter plates 330D' for sliding translational movement required for moving window W between its open and closed positions. As seen, each of window lifter plates 330D' are attached via cables, routed around one or more of pulleys 330C, 330B to a drum (now shown) that is rotated via actuation of power-operated window lift actuator 330A.

Figure 19:
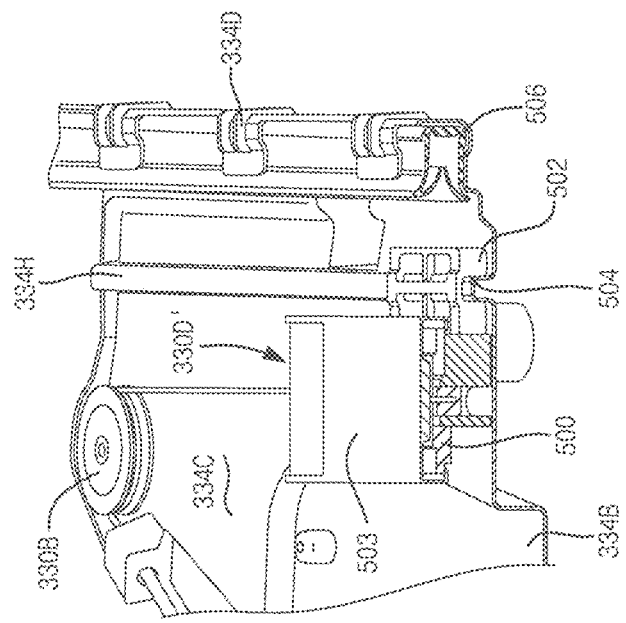
Figure 18:
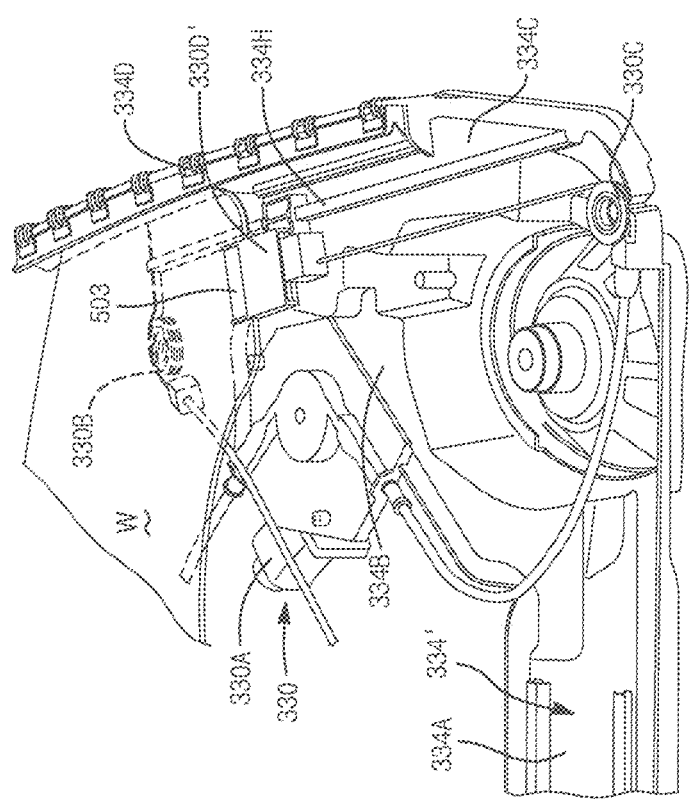

Referring particularly to FIGS. 18 and 19, portions of first carrier member 334' are shown to better illustrate the configuration of first slider rail 334H and first glass run channel 334D formed in first widow regulator rail segment 334C. As seen, first window lifter plate 330D' includes a first body section 500 and a second body section 502. First body section 500 supports a first window retainer 503 which, in turn, holds a first portion of window W. First body section 500 is configured to receive and retain end portions of a suitable cable drive system associated with power-operated window regulator 330. Second body section 502 defines a guide channel 504 aligned to surround the upper and both lateral side surfaces of first slider rail 334H. Note that a first window seal 506 is retained in first glass run channel 334D and functions to retain a first side edge of window W therein for low friction sliding movement.

Figure 20:
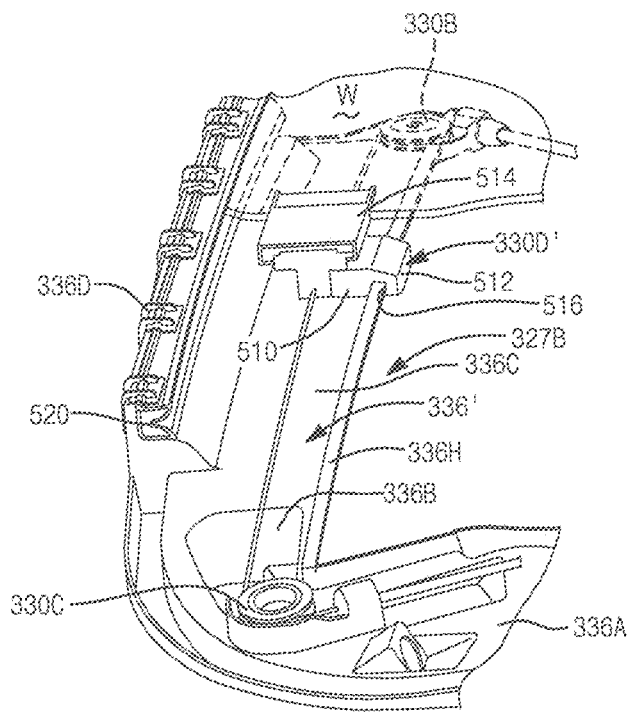
Figure 21:
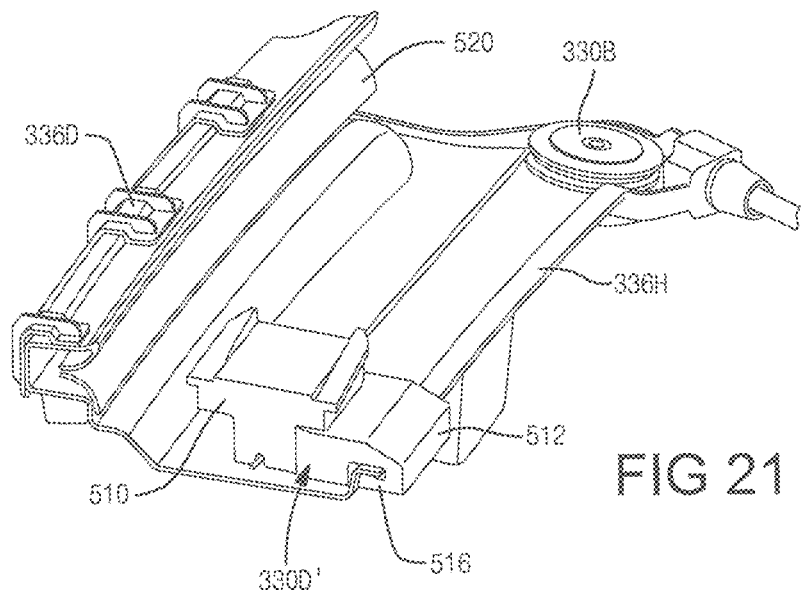

Referring particularly to FIGS. 20 and 21, portions of second carrier member 336' are shown to better illustrate the configuration of second slider rail 336H and second glass run channel 336D formed in second window regulator rail segment 336C. As seen, second window lifter plate 330D' includes a first body section 510 and a second body section 512. A second window retainer 514 is secured to first body section 510 and holds a second portion of window W. First body section 510 is configured to receive and retain portions of the cable drive system associated with power-operated window regulator 330. Second body section 512 defines a L-shaped guide channel 516 aligned to surround second slider rail 336H. Note that a second window seal 520 is retained in second glass run channel 336D and retains a second side edge of window W therein for low friction sliding movement. The "integration" of the first and second slider rails into two-piece carrier plate 327B provides an arrangement for directly supporting the window lifter plates of the window regulator assembly. While each of the first and second slider rails is shown with a different profile, it is understood that any rail feature providing a window guiding and support function is within the scope of the present disclosure.

Figure 22:
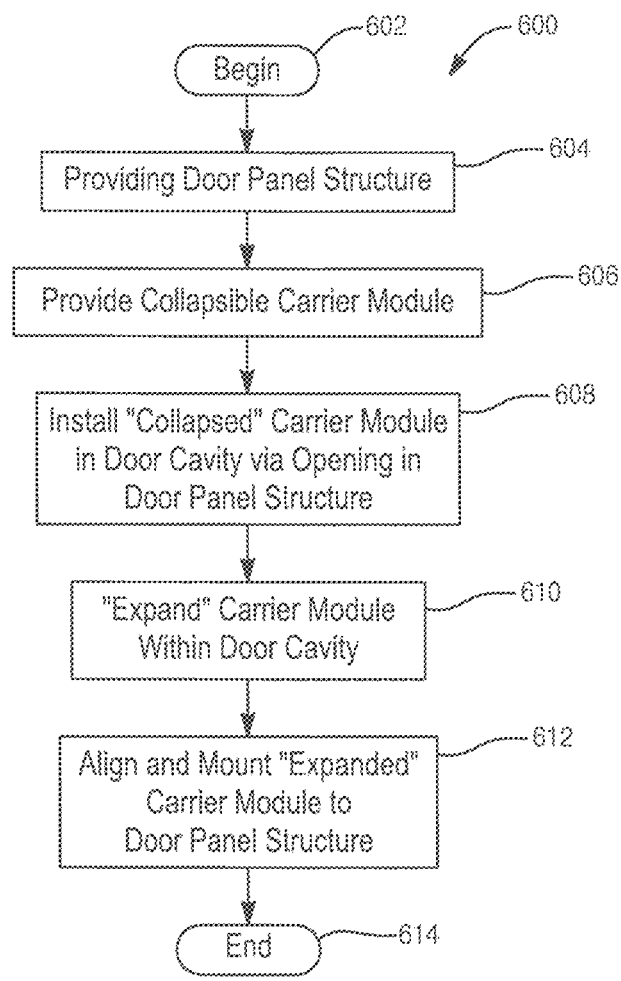
Figure 24A:
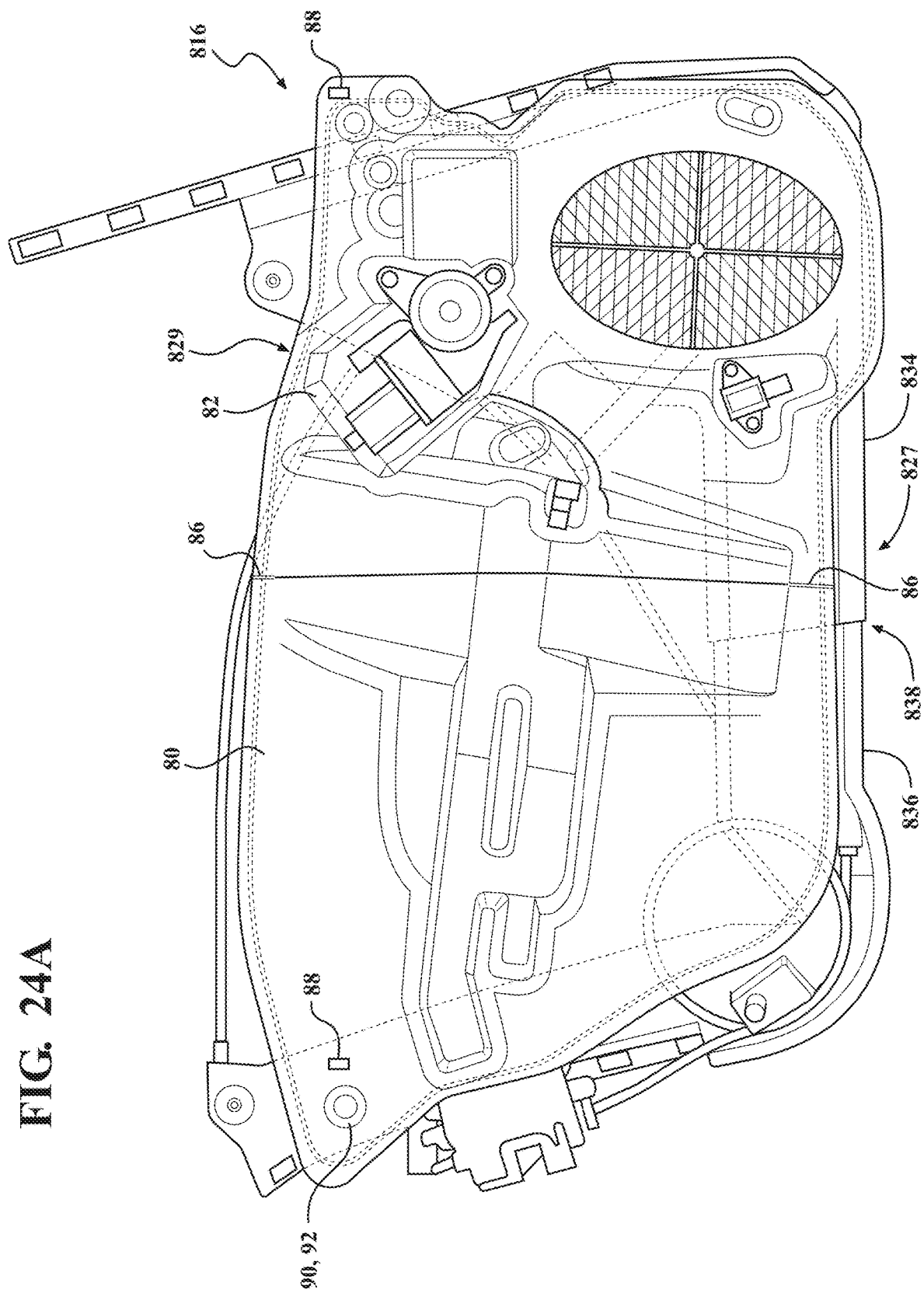
FIG. 24A is a dry side view of the carrier module of FIG. 23.
Figure 24C:
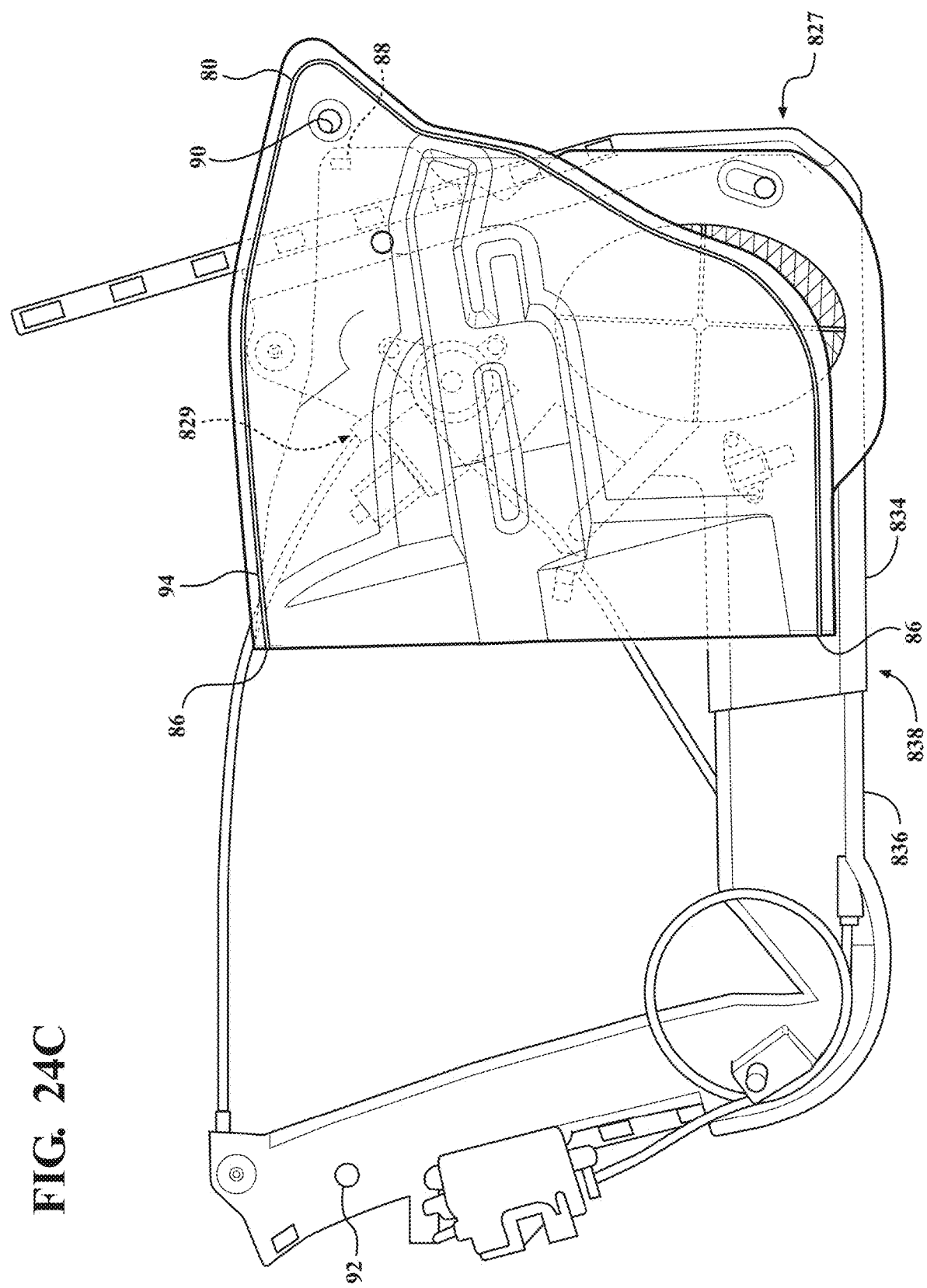
FIG. 24C is a dry side view of the carrier module of FIG. 23 with a barrier associated with the carrier module shown in a folded state.

FIG. 22 illustrates a method 600 for assembly of a door assembly 300 equipped with one of the collapsible carrier modules of the present disclosure. The method begins at step 602. Step 604 includes providing door panel structure 318 having outer panel 313 and inner panel 314 connected together to define an internal cavity 320 and an access opening 322. Step 606 includes providing a collapsible carrier module 316, 316A, 316B having a two-member carrier plate 327, 327A, 327B. Step 608 includes installing the carrier module in its pre-installed/collapsed orientation into door cavity 320 through opening 322. Step 610 includes expanding the carrier module within door cavity 320 from its pre-installed/collapsed orientation into a post-installed/assembled orientation and engaging the locking mechanism(s). Step 612 includes aligning the carrier module and rigidly mounting the carrier module to door panel structure 318. The method ends at step 614.

The present disclosure provides a first embodiment of a collapsible carrier plate 327 (FIGS. 11-14), a second embodiment of a collapsible carrier plate 327A (FIGS. 15-16), and a third embodiment of a collapsible carrier plate 327B (FIGS. 17-21), each of which respectively rely on at least one of a translational movement and a rotational movement to provide a collapsible carrier module capable of being installed through an opening in the inner door panel for subsequent expansion prior to mounting within the door cavity. Those skilled in the art will recognize that the present disclosure may include a fourth embodiment which integrates both the translational version and the rotational version into a common arrangement. In such a configuration, the second base segment of the second carrier member would be moveable axially relative to the first base segment of the first carrier member and secured in its axially extended position via a first locking mechanism. Additionally, the second rail segment of the second carrier member would be pivotably connected to the second base segment and rotatably moveable relative thereto and secured in its open position via a second locking mechanism. Such a combination sliding and rotationally collapsible configuration would provide the ability to install the carrier module in tighter door packaging environments.

Referring now to FIGS. 23 and 25A-25C, a door assembly 800 constructed in accordance with another aspect of the disclosure is illustrated which is configured to be mounted to body 11 of motor vehicle 12 (FIG. 1). Door assembly 800 is similar to door assembly 300; however, a carrier module 816 (FIGS. 23, 24A-24C and 25A-25C) constructed in accordance with another aspect of the disclosure is assembled thereto, with the carrier module 816 including a collapsible carrier plate 827 and an integrated barrier component, referred to hereafter as barrier 80, the structure and function of which will be detailed with greater specificity hereinafter.

With particular reference to FIGS. 24A-24C and 25A-25C, carrier module 816 is shown including collapsible carrier plate 827 being the same or substantially the same as carrier plate 327 of FIGS. 13-14 and carrier plate 327B of FIG. 17. As such, carrier plate 827 includes a plurality of door hardware components 829 mounted to carrier plate 827, such as discussed above, and thus, further specific mention of the individual hardware components is believed unnecessary, as one skilled in the art will readily appreciate their inclusion, as desired, and function in view of the above disclosure and figures.

The carrier plate 827, as discussed above for the carrier plate 327, is a two-piece panel assembly configured to hold a plurality of the aforementioned powered actuators and door hardware components and which is adapted to be installed within internal door cavity 320 via opening 322 formed in inner door panel 314 so that, upon installation, all attached hardware components are located in position for operation. Carrier plate 827 includes a first carrier member 834, a second carrier member 836 interconnected to first carrier member 834 via a sliding connection arrangement 838, with a locking mechanism, as discussed above, operably associated with sliding connection arrangement 838. Given the details discussed above for carrier plate 327, further discussion of the details of carrier plate 827 and function thereof are believed unnecessary, as one possessing ordinary skill in the art will readily appreciate the details, function and operation of carrier plate 827 in view of the aforementioned discussion and figures.

A notable distinction of carrier plate module 816 over carrier plate module 316 is the inclusion of barrier 80 therewith. In accordance with a non-limiting embodiment, barrier 80 is intended to function as a fluid (water) barrier, or as a fluid barrier and as a sound barrier. Barrier 80 can be provided as a single-piece panel configured to receive a plurality of the aforementioned powered actuators and door hardware components 829 in integrally formed first pockets 82 contoured to mate with corresponding second pockets 84 (backside of pocket shown in FIG. 24B) formed integrally in at least one of the first and second carrier members 834, 836. With the first pockets 82 disposed in nested relation in the second pockets 84, the powered actuators and door hardware components can then be disposed in the first pockets 82 and subsequently fastened therein, such as via common interior fasteners, threaded and otherwise, wherein the interior fasteners are configured to extend through the barrier 80 for fixed attachment to the respective one or both first and second carrier members 834, 836. In one example embodiment, the powered actuators and door hardware components are fixed within first pockets 82 disposed in corresponding second pockets 84 of the first carrier member 834, with the barrier 80 remaining detached from the second carrier member 836 to facilitate assembly, as discussed further below. The barrier 80 is adapted to be installed to an outer surface (facing the interior cabin of the vehicle) of the inner panel 314 upon fixing the first and second carrier members 834, 836 in their respective positions within the internal door cavity 320.

Barrier 80 is preferably collapsible, and is shown as being foldable in half or otherwise via at least one or more hinges, such as a living hinge 86 or other mechanical hinge arrangement. Accordingly, it is to be recognized that the barrier 80 can be formed as a single piece of material including one or more living hinges 86, or formed from separate pieces of material that are subsequently hingedly joined to one another via separate hinges. As such, the barrier 80 can be provided to fold into the desired configuration, preferably to expose the opening 322, to form a reduced envelop of the outer periphery, thereby enhancing the ease of assembly of the first and second carrier members 834, 836 and other components into the internal door cavity 320, and further reducing the outer peripheral size to facilitate handling, shipping and storage. To further facilitate maintaining the barrier 80 in a folded configuration, the barrier 80 can be provided with fastener features 88 that releasably couple to one another while the barrier 80 is in a folded state, whereupon the fastener features 88 can be readily uncoupled from one another during assembly. It is contemplated herein that the fastener features 88 could be provided as a hook-and-loop type fastener, snaps, and the like.

Barrier 80 can be formed of any suitable fluid barrier material or fluid and sound barrier material, as desired, in order to meet the necessary specifications, such as a foam, plastic, nonwoven, textile, or like materials. Further, in order to facilitate assembly, including ensuring the barrier 80 is properly located and fixed in sealed relation relative to the outer surface of the inner panel 314, barrier 80 can be formed with at least one locating feature 90, shown by way of example as a female recess, configured for mating engagement with a corresponding locating feature 92, shown by way of example as a male protrusion, on at least one of the separate first and second carrier members 834, 836, and can further include a peripherally extending seal bead 94. The locating features 90, 92 can be formed to provide a snug, interlocking interference fit with one another. Seal bead 94 can be provided as any suitable adhesive material capable of maintaining a fluid-tight seal between the barrier 80 and an outer surface of the inner panel 314, such as butyl, by way of example and without limitation.

In assembly, the first and second carrier members 834, 836, while in their compressed state, are disposed through the opening 322 into the internal door cavity 320, with the barrier 80 being fixed to the first carrier member 834, such as via the aforementioned fasteners fixing the powered actuators and door hardware components 829 within first pockets 82 (FIG. 25C). To facilitate assembly, the barrier member 80 can be releasably maintained in its folded state via fastener features 88 to allow ready access to the carrier members 834, 836 upon being disposed through the opening 322 into the internal door cavity 320. During assembly, a periphery of the inner panel 314 bounding the opening 322 is disposed in a gap between the first carrier member 834 and the barrier 80, such that the barrier member 80 remains outside the internal door cavity 320 for subsequent sealed attachment thereto. Then, with the barrier 80 in its folded state (FIGS. 25A and 25B), access to the second carrier member 836 is readily available to extend the second carrier member 836 from the collapsed position to a fully extended assembled state, whereupon the locking mechanism can be employed to lock the first and second carrier members 834, 836 in their fully deployed configuration, as discussed above with regard to FIGS. 11-14 (FIG. 25B). Then, with the carrier members 834, 836 fixed in position within the internal door cavity 320, the fastener features 88 can be decoupled from one another and the barrier 80 can be unfolded and attached about its entire outer periphery to the outside of the inner panel 314 via the seal bead 94 to enclose, or otherwise close off, the opening 322 and perfect a fluid-tight seal between the barrier 80 and the inner panel 314, thereby preventing the ingress of water (fluid) from the wet side to the dry side of the inner panel 314 of the door assembly 800 (FIG. 25C) as a result of the opening 322 being closed off via the fluid impervious barrier 80.

Figure 26A:
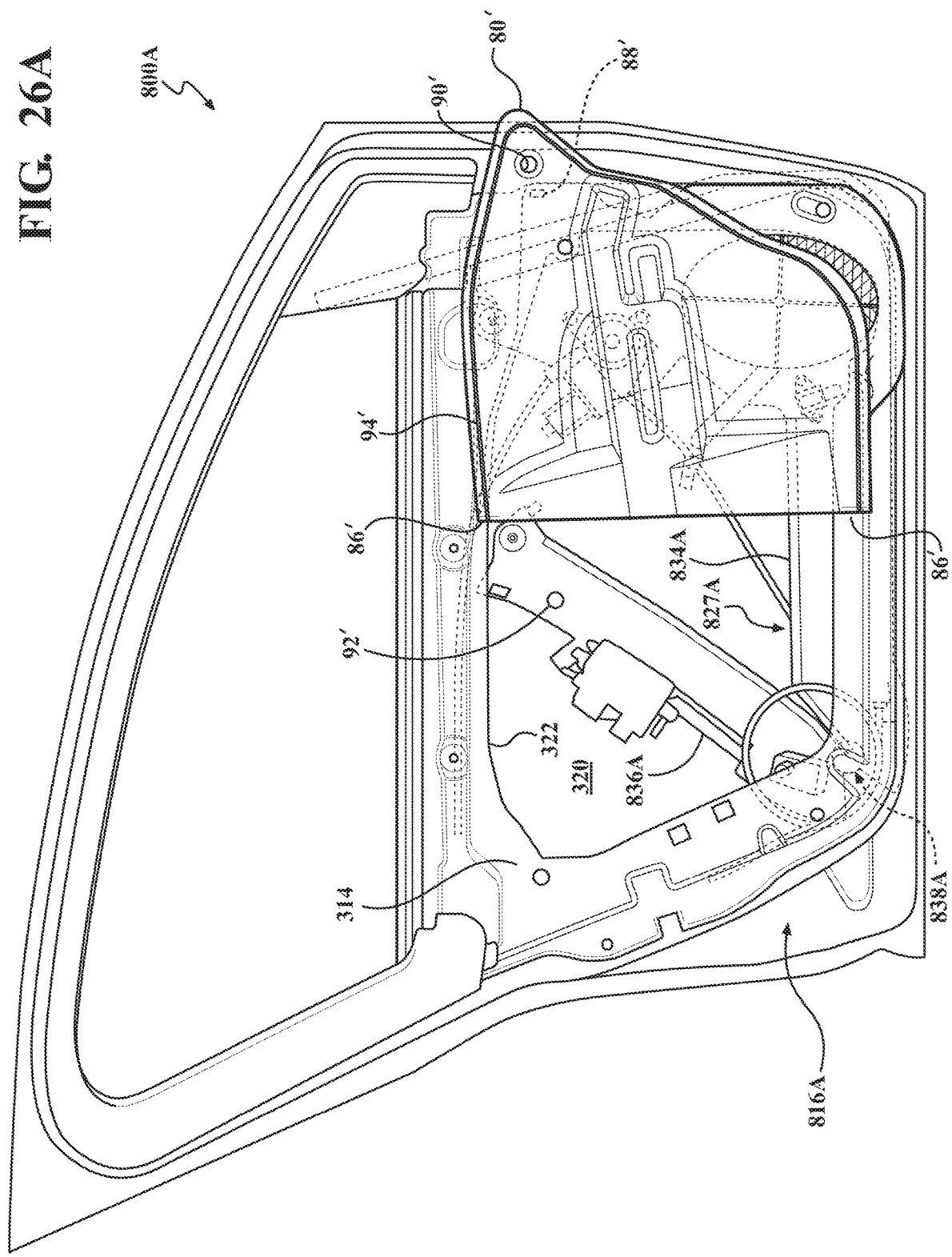
FIG. 26A is a side view of a dry side of the door assembly showing a carrier module constructed in accordance with another aspect of the disclosure being assembled thereto with a carrier plate of the carrier module shown a pre-installed collapsed configuration and a barrier of the carrier module shown in a pre-installed folded configuration.
Figure 26C:
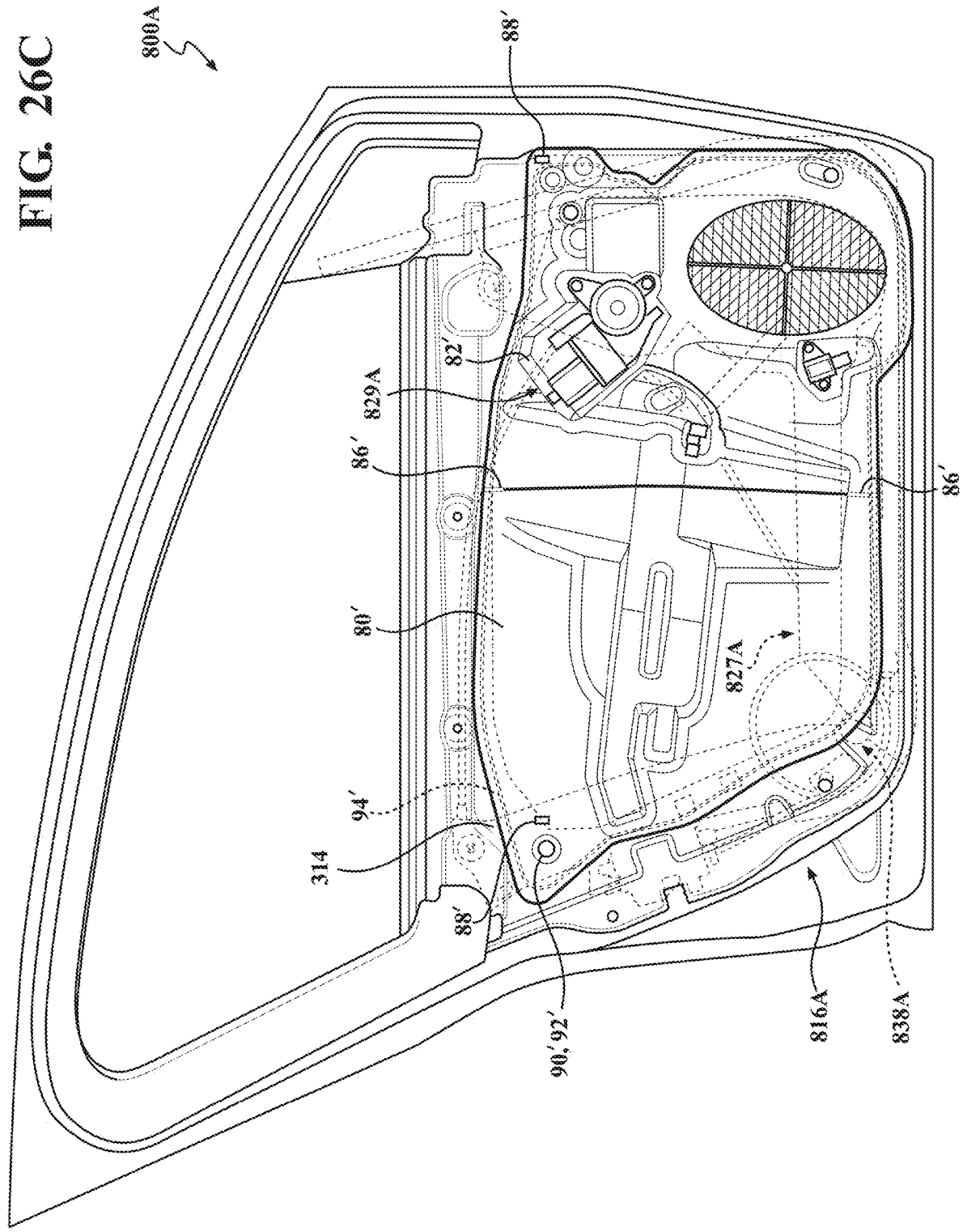
FIG. 26C is a view similar to FIG. 26B with the barrier shown in an unfolded, post-installed assembly configuration.

With particular reference to FIGS. 26A-26C, a door assembly 880A having a carrier module 816A constructed in accordance with another aspect of the disclosure is shown, with the carrier module 816A including a collapsible carrier plate 827A and an integral water and sound barrier, referred to hereafter as barrier 80'.

Collapsible carrier plate 827A is the same or substantially the same as carrier plate 327A of FIGS. 15-16. As such, carrier plate 827A utilizes a pivotable movement instead of a translational movement between a pair of carrier members to establish the pre-installed/collapsed arrangement as well as the post-installed/assembled arrangement. In particular, carrier plate 827A is configured to generally include a first carrier member 834A, a second carrier member 836A interconnected to first carrier member 834A via a hinged-pivot connection arrangement 838A, and a locking mechanism operably associated with pivot connection arrangement 838A, as discussed above. Need for discussion of further details is believed unnecessary, as one skilled in the art will readily recognize the similarity of carrier plate 827A with carrier plate 327A.

A notable distinction of carrier plate module 816A over carrier plate module 316A is the inclusion of integral barrier 80' therewith. In accordance with a non-limiting embodiment, barrier 80', intended to function as a fluid barrier or as both a fluid (water) barrier and a sound barrier, can be provided as a single-piece panel in the same or substantially the same fashion as discussed above for barrier 80. Accordingly, barrier 80' can be configured to receive a plurality of the aforementioned powered actuators and door hardware components 829A in integrally formed first pockets 82' contoured to mate with corresponding second pockets formed integrally in at least one of the first and second carrier members 834A, 836A, as discussed above. With the first pockets 82' disposed in mating fashion in the second pockets, the powered actuators and door hardware components 829A can then be disposed in the first pockets 82' and subsequently fastened therein, such as via common interior fasteners, threaded and otherwise, wherein the interior fasteners are configured to extend through the barrier 80' for fixed attachment to the respective one or both first and second carrier members 834A, 836A. In one example embodiment, the powered actuators and door hardware components 829A are fixed within first pockets 82' disposed in corresponding second pockets of the first carrier member 834A, with the barrier 80' remaining detached from the second carrier member 836A to facilitate assembly, as discussed above for barrier 80.

Barrier 80' is preferably collapsible, and is shown as being foldable in half, or otherwise, via at least one or more hinges, such as a living hinge 86' or other mechanical hinge arrangement. As such, barrier 80' can be provided to fold into the desired configuration, preferably to expose the opening 322, to form a reduced envelop of the barrier outer periphery, thereby enhancing the ease of assembly of the first and second carrier members 834A, 836A and other components, as desired, through the opening 322 into the internal door cavity 320, and further reducing the outer peripheral size to facilitate handling, shipping and storage. Barrier 80' can further be provided with fastener features 88' as discussed above for barrier 80 to facilitate handling and assembly.

Barrier 80' can be formed of any suitable fluid sound barrier material or fluid and sound barrier material, such as from those materials discussed above for barrier 80. Further, barrier 80' can be formed with locating features 90' configured for mating engagement with corresponding locating features 92', as discussed above, on at least one of the separate first and second carrier members 834A, 836A, and can further include a peripherally extending seal bead 94' to establish and maintain a fluid-tight seal between the barrier member 80' and an outer surface of the inner panel 314.

In assembly, the first and second carrier members 834A, 836A are disposed through the opening 322 into the internal door cavity 320, with the barrier 80' being fixed to the first carrier member 834A, such as via the aforementioned fasteners fixing the powered actuators and door hardware components within first pockets 82'. Then, with the barrier 80' in its folded state, access to the second carrier member 836A is readily available to pivotally unfold the second carrier member 836A from the collapsed position to a fully extended assembled state, whereupon the locking mechanism can be employed to lock the first and second carrier members 834A, 836A in their fully deployed configuration, as discussed above with regard to FIGS. 15-16. Then, with the carrier members 834A, 836A fixed in position within the internal door cavity 320, the barrier 80' can be unfolded and attached about its entire outer periphery to the outside of the inner panel 314 via the seal bead 94' to close off the opening 322 and perfect a fluid-tight seal between the barrier 80' and the inner panel 314, thereby preventing the ingress of water (fluid) from the wet side to the dry side of the door assembly 800A.

Figure 27B:
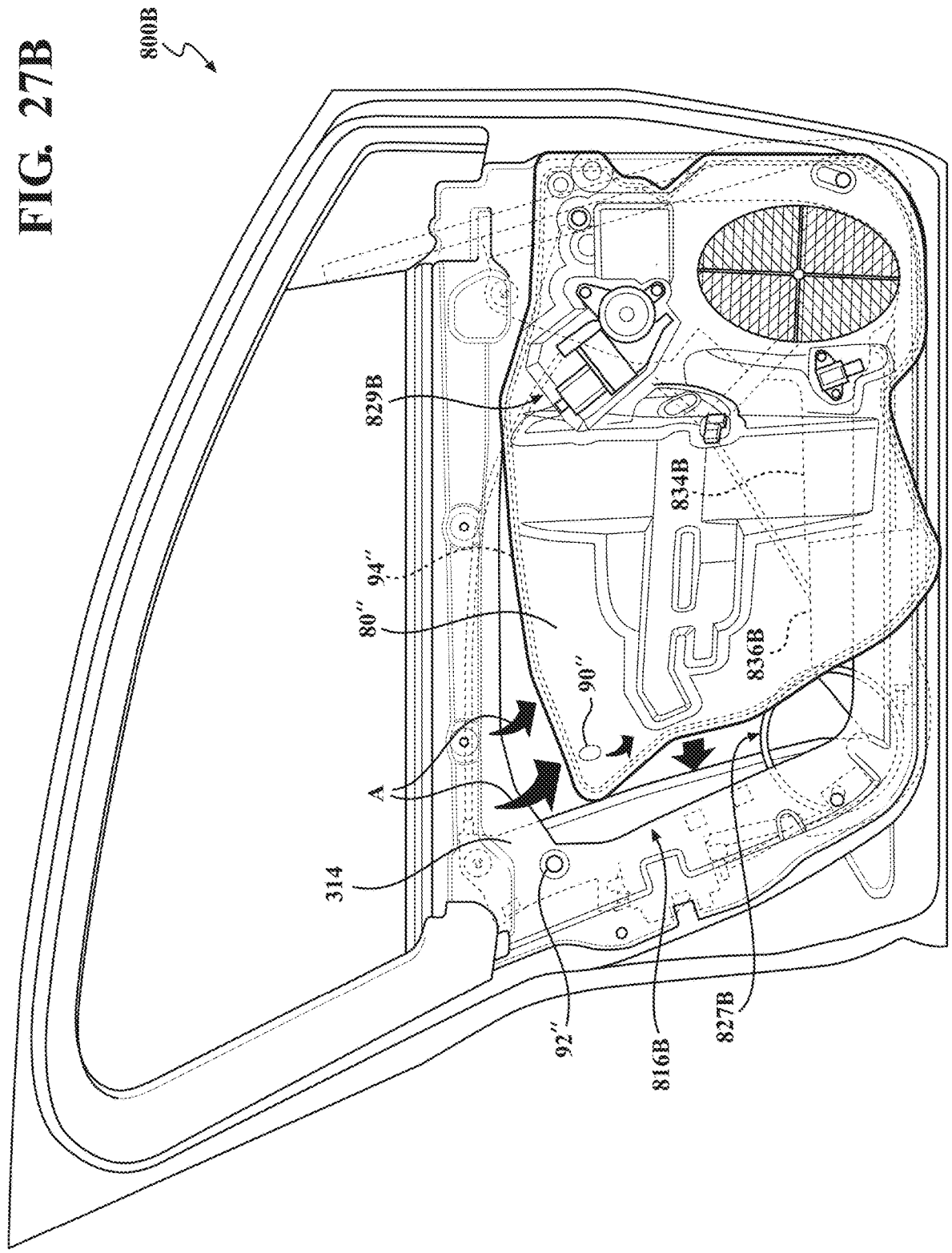
FIG. 27B is a view similar to FIG. 27A with the carrier plate shown in an extended, post-installed assembly configuration.

With particular reference to FIGS. 27A-27C, a door assembly 800B having a carrier module 816B constructed in accordance with another aspect of the disclosure is shown, with the carrier module 816B including a collapsible carrier plate 827B and an integral water barrier or water and sound barrier, referred to hereafter as barrier 80", wherein the collapsible carrier plate 827B is shown being the same as carrier plate of FIGS. 11-14; however, it is to be recognized that the carrier plate of FIGS. 15-16 could equally be employed.

Carrier module 816B is substantially the same as discussed above for carrier modules 816; however, barrier 80" does not have a hinge, and thus, it is not intended to be folded. Otherwise, all else remains the same as discussed above. Accordingly, barrier 80" can be formed with locating features 90" configured for mating engagement with corresponding locating features 92" on at least one of the separate first and second carrier members 834B, 836B, and shown as the fixed to the first carrier member 834B, and can further include a peripherally extending seal bead 94".

In assembly, the first and second carrier members 834B, 836B are disposed through the opening 322 into the internal door cavity 320, with the barrier 80" being fixed to the first carrier member 834B, such as via fasteners fixing the powered actuators and door hardware components 829B within first pockets, as discussed above. In order to insert the first and second carrier members 834B, 836B into the internal door cavity 320, the barrier 80", being flexible, can be pulled away from the inner panel 314 and the second carrier member 836B, as indicated by arrows A in FIGS. 27A and 27B, to allow free access to the internal door cavity 320. Upon disposing the first and second carrier members 834B, 836B into the internal door cavity 320, the second carrier member 836B can be deployed to a fully assembled state, as discussed above, and then, the barrier 80" can be released and pressed against an outer surface of the inner panel 314 to bond the entire outer periphery of the barrier 80" to the outer surface of the inner panel 314 via seal bead 94" to close off the opening 322 and perfect a fluid-tight seal between the barrier 80" the inner panel 314, thereby preventing the ingress of water (fluid) from the wet side to the dry side of the door assembly 800B.

Figure 28:
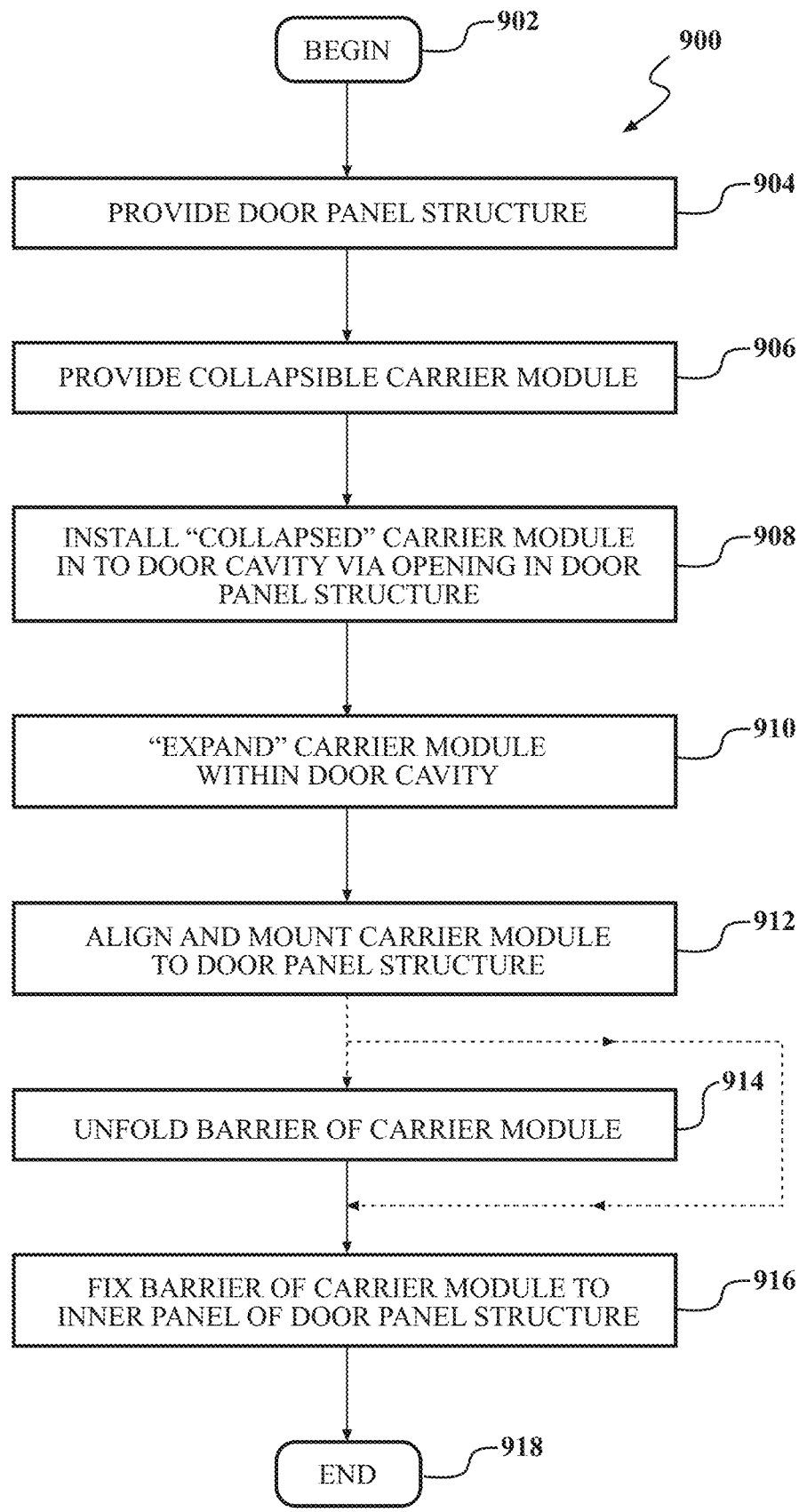
FIG. 28 is a flow diagram illustrative of a further method of making a door assembly in accordance with the present disclosure.

FIG. 28 illustrates a method 900 for assembly of a door assembly 800, 800A, 800B equipped with one of the collapsible carrier modules 816, 816A, 816B of the present disclosure. The method begins at step 902. Step 904 includes providing door panel structure 318 having outer panel 313 and inner panel 314 connected together to define an internal cavity 320 and an access opening 322. Step 906 includes providing a collapsible carrier module 816, 816A, 816B having a two-member carrier plate 827, 827A, 827B. Step 908 includes installing the carrier module in its pre-installed/collapsed orientation into door cavity 320 through opening 322. Step 910 includes expanding the carrier module within door cavity 320 from its pre-installed/collapsed orientation into a post-installed/assembled orientation and engaging the locking mechanism(s). Step 912 includes aligning the carrier module and rigidly mounting the carrier module to door panel structure 318. Step 914 optionally includes unfolding a barrier 80, 80' of the carrier module 316C, 316D if the barrier is provided as being foldable. Step 916 includes fixing the barrier 80, 80', 80" to the inner panel 314, preferably at least in part via a seal bead 94, 94', 94" to close off the opening 322 and perfect a water-tight seal about the entire periphery of the barrier and an outer surface of the inner panel 314. The method ends at step 918.

While the above description constitutes a plurality of embodiments of the present invention, it will be appreciated that the present invention is susceptible to further modification and change without departing from the fair meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door assembly for a vehicle, comprising:
   an outer panel;
   an inner panel connected to the outer panel to form a door panel structure defining an internal door cavity between the inner and outer panels;
   a collapsible carrier module having a carrier plate, the carrier plate configured to move between a collapsed arrangement for installation into the internal door cavity through an opening in the inner panel and an expanded arrangement within the internal door cavity to facilitate mounting of the carrier module to the door panel structure within the internal door cavity, wherein after installation of the carrier plate through the opening, the carrier plate is mounted to an inner surface of the inner panel, wherein the carrier plate includes a first carrier member connected to a second carrier member; and
   a barrier attached to the collapsible carrier module, the barrier being configured to close off the opening in the inner panel after mounting of the carrier module to the door panel structure;
   wherein the barrier is collapsible and includes a first end and second end, wherein the barrier has a collapsed state in which the second end of the barrier folds over a centerline of the barrier, wherein the barrier includes a locating feature configured to engage with a corresponding locating feature on one of the carrier members for locating the barrier in sealed relation with the inner panel.

2. The door assembly of claim 1, wherein the first carrier member is connected to the second carrier member via a connection mechanism permitting relative movement therebetween from a first position defining the collapsed arrangement and a second position defining the expanded arrangement.

3. The door assembly of claim 2, wherein the connection mechanism is a sliding connection configured to permit translational movement between the first and second carrier members.

4. The door assembly of claim 2, wherein the barrier is attached to one of the first and second carrier members and is configured for movement relative to the other of the first and second carrier members to facilitate installation of the first and second carrier members into the internal cavity.

5. The door assembly of claim 4, wherein the barrier has a hinge to facilitate the movement relative to the other of the first and second carrier members.

6. The door assembly of claim 1, wherein the barrier has a seal bead configured to establish a fluid-tight seal between the barrier and the inner panel to prevent the passage of fluid from a wet side of the inner panel to a dry side of the inner panel.

7. The door assembly of claim 2, wherein the connection mechanism is a pivotable connection configured to permit rotational movement between the first and second carrier members.

8. The door assembly of claim 7, wherein the pivotable connection is established between a first base segment of the first carrier member and a second rail segment of the second carrier member.

9. The door assembly of claim 7, wherein the barrier is attached to one of the first and second carrier members and is configured for movement relative to the other of the first and second carrier members to facilitate installation of the first and second carrier members into the internal cavity.

10. The door assembly of claim 9, wherein the barrier has a hinge to facilitate the movement relative to the other of the first and second carrier members.

11. The door assembly of claim 1, wherein the carrier plate includes a first carrier member and a second carrier member, wherein the first carrier member includes a first base segment having a first rail segment supporting a first window lifter plate, wherein the second carrier member includes a second base segment having a second rail segment supporting a second window lifter plate, the first base segment and the second base segment have a connection mechanism therebetween, where a length of the carrier plate in the expanded arrangement is greater than a length of the carrier plate in the collapsed arrangement.

12. The door assembly of claim 11, wherein the first base segment supports the first rail segment supporting the first window lifter plate, the second base segment supports the second rail segment supporting the second window lifter plate, wherein the first and second window lifter plates are configured for sliding translational movement along respectively the first rail segment and the second rail segment to move a door window between open and closed positions.

13. A collapsible carrier plate configured to be installed in a door assembly for a motor vehicle comprising: inner and outer panels defining a door panel structure with an opening in the inner panel extending into an internal door cavity, the collapsible carrier plate comprising:
  a first carrier member connected to a second carrier member via a connection mechanism for movement between a first position defining a collapsed arrangement for the carrier plate and a second position defining an expanded arrangement for the carrier plate, the carrier plate operable in its collapsed arrangement to permit installation through the opening in the inner door panel into the internal door cavity and in its expanded arrangement to permit mounting within the internal cavity, wherein after installation of the carrier plate through the opening the carrier plate is mounted to an inner surface of the inner panel; and
  a barrier attached to the collapsible carrier plate, the barrier being configured to close off the opening in the inner panel after mounting of the carrier plate within the internal cavity;
  wherein the second carrier member is pivotable relative to the first carrier member through a range of motion having a maximum angle that is obtuse relative to the first carrier member;
  wherein the second carrier member includes a locating feature configured to engage with a corresponding locating feature on the barrier for properly locating the barrier in sealed relation with the inner panel.

14. The collapsible carrier plate of claim 13, wherein the barrier is attached to one of the first and second carrier members prior to installation of the first and second carrier members into the internal cavity and is configured for movement relative to the other of the first and second carrier members to facilitate installation of the first and second carrier members into the internal cavity.

15. The collapsible carrier plate of claim 13, wherein the barrier has a seal bead configured to establish a fluid-tight seal between the barrier and the inner panel to prevent the passage of fluid from a wet side of the inner panel to a dry side of the inner panel.

16. The collapsible carrier plate of claim 13, wherein the connection mechanism is a pivotable connection configured to permit rotational movement between the first and second carrier members.

17. The collapsible carrier plate of claim 16, wherein the barrier is attached to one of the first and second carrier members prior to installation of the first and second carrier members into the internal cavity and is configured for movement relative to the other of the first and second carrier members to facilitate installation of the first and second carrier members into the internal cavity.

18. The door assembly of claim 13, wherein the first carrier member includes a first base segment having a first rail segment supporting a first window lifter plate, wherein the second carrier member includes a second base segment having a second rail segment supporting a second window lifter plate, the first base segment and the second base segment have a connection mechanism therebetween, where a length of the carrier plate in the expanded arrangement is greater than a length of the carrier plate in the collapsed arrangement.

19. The door assembly of claim 18, wherein the first base segment supports the first rail segment supporting the first window lifter plate, the second base segment supports the second rail segment supporting the second window lifter plate, wherein the first and second window lifter plates are configured for sliding translational movement along respectively the first rail segment and the second rail segment to move a door window between open and closed positions.

* * * * *